United States Patent
Ellis et al.

(10) Patent No.: US 10,115,222 B2
(45) Date of Patent: Oct. 30, 2018

(54) DATA PROCESSING SYSTEMS

(71) Applicant: ARM Limited, Cambridge (GB)

(72) Inventors: Sean Tristram LeGuay Ellis, Farnham (GB); Thomas James Cooksey, Fulbourn (GB); Robert Martin Elliott, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/401,639

(22) Filed: Jan. 9, 2017

(65) Prior Publication Data

US 2017/0206698 A1  Jul. 20, 2017

(30) Foreign Application Priority Data

Jan. 15, 2016 (GB) .................................. 1600770.0

(51) Int. Cl.
*G06T 15/00* (2011.01)
*G06T 15/80* (2011.01)

(52) U.S. Cl.
CPC ............ *G06T 15/005* (2013.01); *G06T 15/80* (2013.01)

(58) Field of Classification Search
CPC .............................. G06T 1/20; G06T 2210/52
See application file for complete search history.

(56) References Cited

U.S. PATENT DOCUMENTS

| 7,546,444 | B1* | 6/2009 | Wolrich | ............. | G06F 9/30098 |
| | | | | | 712/228 |
| 8,473,948 | B1* | 6/2013 | Le Grand | ................. | G06F 9/52 |
| | | | | | 718/100 |
| 8,564,604 | B2 | 10/2013 | Jiao | | |
| 2006/0184741 | A1 | 8/2006 | Hrusecky | | |
| 2009/0300621 | A1 | 12/2009 | Mantor | | |
| 2010/0201703 | A1* | 8/2010 | Jiao | ....................... | G11B 7/0053 |
| | | | | | 345/589 |
| 2011/0261063 | A1* | 10/2011 | Jiao | ....................... | G06F 9/3004 |
| | | | | | 345/522 |
| 2012/0079200 | A1* | 3/2012 | Dally | ..................... | G06F 12/06 |
| | | | | | 711/119 |

(Continued)

OTHER PUBLICATIONS

GB Combined Search and Examination Report dated Jun. 15, 2016, GB Patent Application GB1600770.0.

*Primary Examiner* — Thomas Lett
(74) *Attorney, Agent, or Firm* — Vierra Magen Marcus LLP

(57) ABSTRACT

A graphics processing unit comprises a programmable execution unit executing graphics processing programs for execution threads to perform graphics processing operations, a local register memory comprising one or more registers, where registers of the register memory are assignable to store data associated with an individual execution thread that is being executed by the execution unit, and where the register(s) assigned to an individual execution thread are accessible only to that associated individual execution thread, and a further local memory that is operable to store data for use in common by plural execution threads, where the data stored in the further local memory is accessible to plural execution threads as they execute. The programmable execution unit is operable to selectively store output data for an execution thread in a register(s) of the local register memory assigned to the execution thread, and the further local memory.

17 Claims, 9 Drawing Sheets

(56) References Cited

U.S. PATENT DOCUMENTS

| | | | | |
|---|---|---|---|---|
| 2012/0185866 A1* | 7/2012 | Couvee | ............... | G06F 9/5044 |
| | | | | 718/104 |
| 2013/0117734 A1* | 5/2013 | Kong | ..................... | G06F 8/443 |
| | | | | 717/149 |
| 2015/0149744 A1* | 5/2015 | Pedersen | ............ | G06F 9/30036 |
| | | | | 712/7 |

* cited by examiner

DATA PROCESSING SYSTEMS

BACKGROUND

The technology described herein relates to data processing systems, and in particular to arrangements for the execution of graphics processing operations in a graphics processing unit of a graphic processing system.

Graphics processing is typically carried out in a pipelined fashion, with one or more pipeline stages operating on the data to generate the final render output, e.g. frame that is displayed. Many graphics processing pipelines now include one or more programmable processing stages, commonly referred to as "shaders". For example, a graphics processing pipeline may include one or more of, and typically all of, a geometry shader, a vertex shader and a fragment (pixel) shader. These shaders are processing stages that execute shader programs on input data values to generate a desired set of output data (e.g. appropriately shaded and rendered fragment data in the case of a fragment shader) for processing by the rest of the graphics pipeline and/or for output.

A shader program to be executed by a given "shader" of a graphics processing pipeline will be provided by the application that requires the processing by the graphics processing pipeline using a high level shader programming language, such as GLSL, HLSL, OpenCL, etc. This shader program will consist of "expressions" indicating desired programming steps defined in the relevant language standards (specifications). The high level shader program is then translated by a shader language compiler to binary code for the target graphics processing pipeline. This binary code will consist of "instructions" which are specified in the instruction set specification for the given target graphics processing pipeline.

Thus, references to "expressions" herein, unless the context otherwise requires, refer to shader language constructions that are to be compiled to a target graphics processor binary code (i.e. are to be expressed in hardware micro instructions). (Such shader language constructions may, depending on the shader language in question, be referred to as "expressions", "statements", etc. For convenience, the term "expressions" will be used herein, but this is intended to encompass all equivalent shader language constructions such as "statements" in GLSL.) "Instructions" correspondingly refer to the actual hardware instructions (code) that are emitted to perform an "expression".

A graphics shader performs processing by running small programs for each graphics "work item" in a graphics output to be generated, such as a render target, e.g. frame (a "work item" in this regard is usually a vertex or a sampling position (e.g. in the case of a fragment shader)). Where the graphics processing pipeline is being used for "compute shading" (e.g. under OpenCL or DirectCompute) then the graphics work items will be appropriate compute shading work items. This generally enables a high degree of parallelism, in that a typical render output, e.g. frame, features a rather large number of graphics work items (e.g. vertices or fragments), each of which can be processed independently.

In graphics shader operation, each "work item" is processed by means of an execution thread which will execute the shader program in question for the graphics "work item" in question.

The Applicants have recognised that many graphics shader programs will include calculations (expressions) that will produce identical values for sets of plural threads to be executed (e.g. for every thread in a draw call).

For example, the OpenGL ES vertex shader:

```
uniform mat4 a;
uniform mat4 b;
uniform mat4 c;
attribute vec4 d;
void main( )
{
gl_Position = a * b * c * d;
}
``` will produce identical values for the computation of "a*b*c" for each thread (where each thread represents a given vertex), as the data inputs a, b, c are uniform variables, i.e. variables that are defined externally to the shader program and so are constant within the shader program.

FIG. 1 shows schematically the execution of multiple threads in parallel in a shader program, where the shader program includes "common" calculations (expressions) 1 (i.e. expressions that will produce the same value(s) each time they are executed for some or all threads in a group of threads that are executing the shader program) whose inputs comprise only uniform variables (variables that are defined externally to the shader program and so are constant within the shader program), followed by "non-common" or "per thread" calculations (expressions) 2 (i.e. that will (potentially) produce a different value(s) for each thread in a group of threads that are executing the shader program) whose inputs comprise non-uniform variables or attributes (i.e. that can potentially vary from thread to thread) together with the results of the common calculations 1.

As shown in FIG. 1, when the shader program is executed for multiple threads (thread 0 to thread 3) in parallel, one or more uniform variables are read from a memory 3 in which the uniform variables are stored, and each thread independently executes the common calculations (expressions) 1. The results of the common calculations 1 are stored in each thread's local register or registers 4. One or more other non-uniform variables or attributes are then read for each thread from an attribute memory 5 in main memory, each thread executes the non-common calculations (expressions) 2, and the results are stored in each thread's local register or registers 4. The final result is then written out 6 for each thread to a result memory 7 in main memory.

As the inputs to the common calculations (expressions) 1 comprise only uniform variables, the results of these calculations will be identical for all of the threads. Thus, if the computation of the common calculations (expressions) 1 could be executed once and the result shared between the plural threads, the execution of the shader program could be made more efficient.

The Applicants have previously proposed in their earlier UK patent application no. GB A 2516358 the use of a "pilot" shader program to execute once expressions that will produce identical values for a set of plural threads (e.g. for a draw call), and then a "main" shader program which is executed for each thread and uses the results of the "pilot shader", instead of recalculating the common expressions each time.

This is illustrated by FIG. 2. As shown in FIG. 2, instead of each thread independently executing the common calculations (expressions) 1, a single "pilot thread" executes the common calculations 1, and the result is stored in main memory 8. This result is then shared between each of the plural threads by loading the result from main memory 8 into each thread's register 4. Each thread can then read one or more other non-uniform variables or attributes as appropriate from the attribute memory 5, execute the non-common calculations 2, and store the results in the thread's register 4. Again, the final results can be written out 6 for each thread to a result memory 7.

FIG. 3 shows the relevant functional units of a data processing system that are used to perform (and thus to act as) various ones of the processing operations described in relation to FIGS. 1 and 2.

As shown in FIG. 3, the data processing system includes a thread group generator 10, a thread generator 11, a thread scheduler 12, a (programmable) synchronous thread execution unit 13, a message passing unit 14, and a load/store unit 15 having an associated queue 16. Also shown in FIG. 3 are the register memory 4 that comprises each thread's register or registers, the main (off-chip) memory 8, and a further memory 3 that is used to store uniform variables to be used by executing threads, together with an associated preload unit 17.

The thread group generator 10 is operable to generate groups of threads for execution by the thread execution unit 13. As part of this operation, as shown in FIG. 3, the thread group generator 10 will cause one or more uniform variables for the thread group to be loaded into the memory 3 from the main memory 8 via the preload unit 17. The thread generator 11 is operable to generate (spawn) individual execution threads of each thread group. The thread scheduler 12 is operable to control the timing of the execution of the threads generated by the thread generator 11 (e.g. in the process of FIG. 2, the thread scheduler ensures that the main graphics work item threads are executed after the execution of the pilot thread has been completed).

The thread execution unit 13 operates to execute shader programs to perform the shader operations of the graphics processing pipeline. To do this, it receives execution threads from the thread scheduler 12 and executes the relevant shader program for those execution threads. As part of this operation, and as shown in FIG. 3, the execution threads can read uniform variables from the memory 3 and can read data from and write data to respective registers 4, in a synchronous manner (i.e. such that the shader program execution for a thread does not continue until the read or write operation has been completed).

The execution threads can also read data from and write data to the main memory 8 in an asynchronous manner (i.e. without the shader program execution for a thread waiting for the read or write operation to complete). This is done by sending requests to the load/store unit 15 via the message passing unit 14 and the queue 16. Data to be stored in main memory 8 is written from the register memory 4. Data read from main memory 8 is loaded into the register memory 4 via the message passing unit 14, from where it can be read synchronously by the execution threads.

Thus, for example, in the process shown in FIG. 2, once the execution unit has executed the pilot thread, its result is stored in main memory 8 by sending a request to the load/store unit 15 via the message passing unit 14 and the queue 16. The message passing unit 14 also informs the thread scheduler 12 that the execution of the pilot thread has completed, so that the main graphics item threads can then be executed. As part of their execution, the result from the pilot thread is shared between each of the plural main threads by loading the result from main memory 8 into each main thread's register 4.

Although the arrangements described above and in GB A 2516358 result in more efficient execution of the shader program, the Applicants believe that there remains scope for improved arrangements for graphics processing units that execute shader programs.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
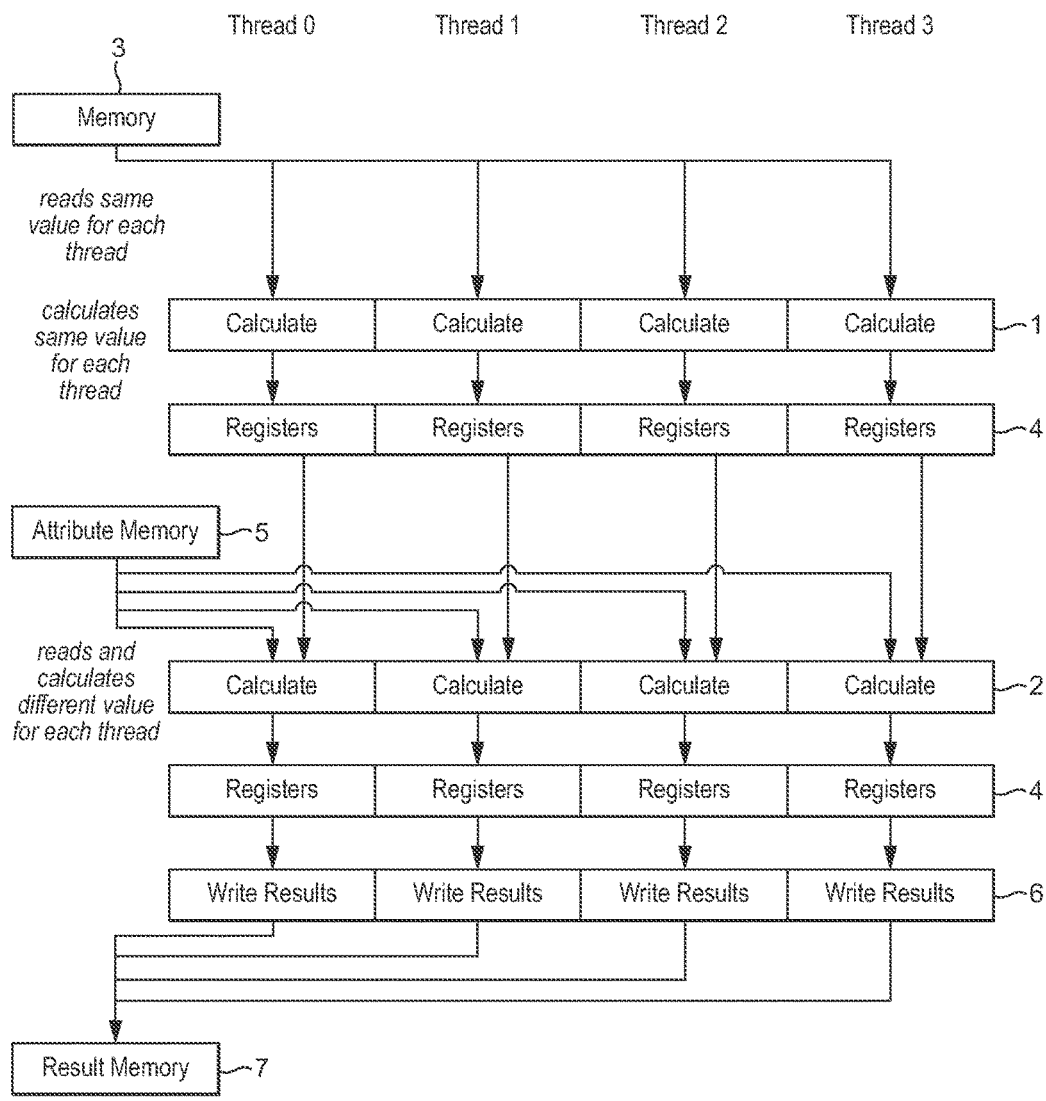
FIG. 1 shows schematically the execution of a shader program by multiple threads in parallel.
Figure 2:
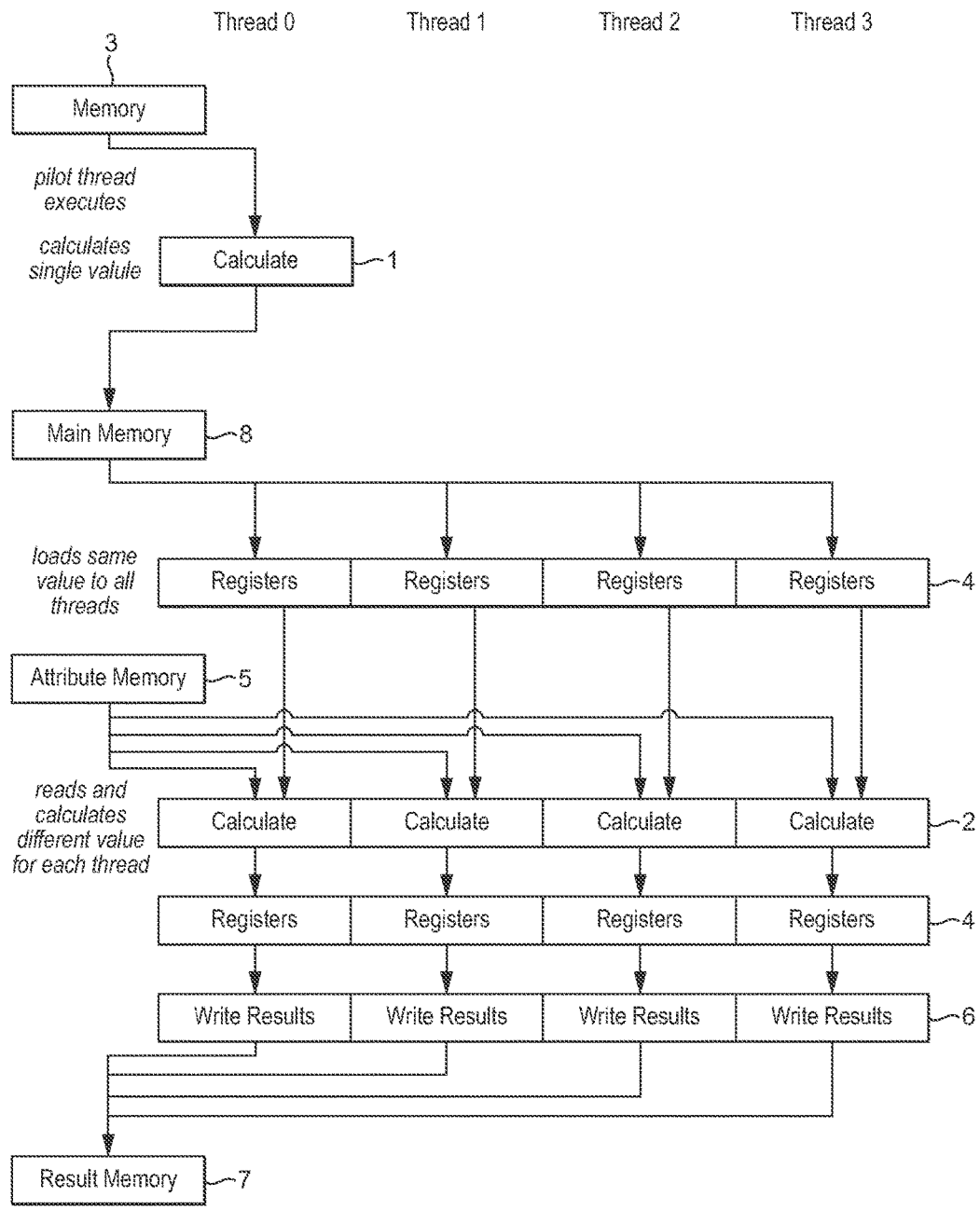
FIG. 2 shows schematically the execution of a shader program by multiple threads in parallel.
Figure 3:
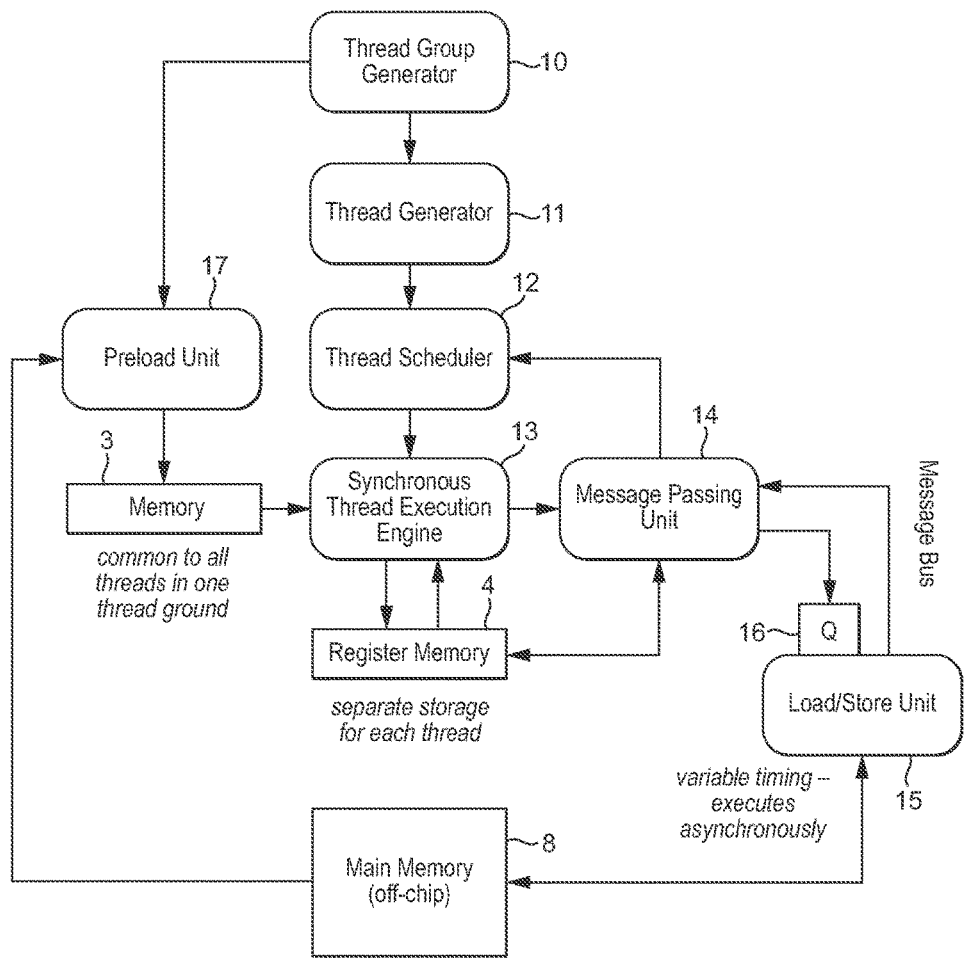
FIG. 3 shows the relevant functional units of a data processing system that are used to perform various ones of the processing operations of FIGS. 1 and 2.

A first embodiment of the technology described herein comprises a graphics processing unit comprising:

a programmable execution unit operable to execute graphics processing programs for execution threads to perform graphics processing operations;

a local register memory comprising one or more registers, respective registers of the register memory being assignable to store data associated with an individual execution thread that is being executed by the execution unit, the register or registers assigned to an individual execution thread being, while that thread executes, accessible only to that associated individual execution thread; and a further local memory operable to store data for use in common by plural execution threads that are being executed by the execution unit, the data stored in the further local memory being accessible to plural execution threads as they execute;

wherein the programmable execution unit is operable to selectively store output data for an execution thread in a register or registers of the register memory assigned to the execution thread, and the further local memory.

A second embodiment of the technology described herein comprises a method of operating a graphics processing unit that comprises:

a programmable execution unit operable to execute graphics processing programs for execution threads to perform graphics processing operations;

a local register memory comprising one or more registers, respective registers of the register memory being assignable to store data associated with an individual execution thread that is being executed by the execution unit, the register or registers assigned to an individual execution thread being, while that thread executes, accessible only to that associated individual execution thread; and a further local memory operable to store data for use in common by plural execution threads that are being executed by the execution unit, the data stored in the further local memory being accessible to plural execution threads as they execute;

the method comprising:

the programmable execution unit when executing a graphics processing program for an execution thread to perform graphics processing operations, storing output data for the execution thread in the further local memory.

The technology described herein relates to graphics processing units that include a programmable execution unit, a local register memory, and a further local memory that stores data that is accessible to plural (and in an embodiment to all) execution threads being executed by the programmable execution unit. In the technology described herein, the programmable execution unit is able not only to store output data for a thread in the register memory, but also to selectively store output data in the further local memory. As will be discussed further below, the Applicants have recognised that this arrangement can lead to more efficient graphics processing.

In particular, the Applicants have recognised that it can be advantageous to provide in a graphics processing system a further local memory as part of the graphics processing unit that can store data for and to be accessed by plural execution threads in common, and for data of threads to be output to that memory as the threads are being executed.

For example, output data for a thread that is to be subsequently used as input data for plural execution threads (e.g. output data from any "common" calculations in a shader program being executed) can be (and in an embodiment is) stored locally to the graphics processing unit in the further local memory, thereby avoiding having to write that data out to external (main) memory and then read it in from external memory to each thread's register (which can be expensive in terms of bandwidth and power).

Furthermore, if such a further local memory is provided as part of the graphics processing unit for another purpose, such as for storing uniform variables or otherwise, the arrangement of the technology described herein will not come at the expense of significant additional hardware or on-chip area (which can again be expensive in terms of power).

The technology described herein therefore provides an improved arrangement for graphics processing units that execute shader programs.

The programmable execution unit can be any suitable and desired programmable execution unit that a graphics processing unit may contain. It should be operable to execute graphics processing programs to perform graphics processing operations. Thus the programmable execution unit will receive graphics threads to be executed, and execute appropriate graphics processing programs for those threads to generate the desired graphics output.

The programmable execution unit may comprise any suitable programmable hardware element such as programmable processing circuitry. The programmable execution unit may be provided as a separate circuit element to other programmable stages of the graphics processing unit or the programmable processing stages may share some or all of their programmable processing circuitry (that is then differently programmed to serve as the desired programmable processing stage).

As well as the programmable execution unit being operable to selectively store output data for an execution thread in a register or registers of the register memory assigned to the execution thread, and the further local memory, the programmable execution unit is in an embodiment also operable to output data to (to store data in) one or more (other) locations. For example, the (final) results of an execution thread may be (and in an embodiment are) output from the programmable execution unit to one or more (other) locations (i.e. one or more locations other than the register memory and the further local memory), e.g. for future use.

Thus, the graphics processing unit is in an embodiment arranged such that the programmable execution unit (an execution thread) can output data to (store (write) data in) one or more (other) locations, e.g. and in an embodiment, according to a store instruction (of a graphics processing program).

The one or more (other) locations to which the programmable execution unit may output data may be selected as desired. In an embodiment, the programmable execution unit is operable to output data for an execution thread to (to store output data in) an external memory of a graphics processing system that the graphics processing unit is part of.

Thus, in an embodiment, the programmable execution unit is operable to selectively store output data for an execution thread in a register or registers of the register memory assigned to the execution thread, the further local memory, and an external memory of a graphics processing system that the graphics processing unit is part of. Correspondingly, in an embodiment, the method further comprises the programmable execution unit when executing a graphics processing program for an execution thread to perform graphics processing operations, selectively storing output data for the execution thread in a register or registers of the register memory assigned to the execution thread, the further local memory, and/or the external memory.

It would additionally or alternatively be possible for the programmable execution unit to be operable to output data (such as the (final) results of an execution thread) to (to store data in), for example, another local memory (i.e. local to (on chip with) the programmable execution unit) and/or a first-in-first-out (FIFO) buffer that may, e.g., be operable to pass the received output data to one or more other stages in a data (graphics) processing pipeline of the graphics processing unit.

The programmable execution unit can execute any suitable and desired graphics processing program, including graphics shading programs such as a geometry shader, a hull shader, a domain shader, a vertex shader, a fragment (pixel) shader or a compute shader (e.g. according to OpenCL or DirectCompute).

The programmable execution unit may operate solely to execute one type of shader, but it will be appreciated in this regard that the execution unit may typically be able to (and in an embodiment can) run plural different types of shader, i.e. the programmable execution unit of the graphics processing unit may be appropriately programmed, e.g. at different times, to function as one type of shader (e.g. as a fragment shader (to perform fragment shading operations)), and to function as other forms (types) of shader.

The techniques of the technology described herein can be used in respect of some but not all of the shader programs to be executed, e.g. for a given processing operation (e.g. draw call), but in an embodiment are used in respect of all shader programs to be executed for a given processing operation (e.g. draw call).

There may be a single or plural programmable execution units. Where there are plural programmable execution units, each execution unit can in an embodiment operate in the manner of the technology described herein.

The programmable execution unit in an embodiment executes graphics processing programs for execution threads that are issued to the programmable execution unit for execution, i.e. to perform graphics processing operations for the execution threads.

In an embodiment a group of plural execution threads is issued to the programmable execution unit for execution. The plural execution threads can comprise any suitable and desired group of plural execution threads. Thus they may, for example, comprise all the threads that are to be executed to generate the desired output, e.g. frame, or part (e.g. tile) of a frame, in question, or they may be a subset of threads within that overall group of threads (e.g. the group of threads to be executed for a given draw call of an overall output that is being generated). The group of threads could also be the threads for a given work group or set of work groups for which the graphics processing program is to be executed (e.g. when the graphics processing unit is performing compute shading operations). Other arrangements would, of course, be possible.

The local register memory may comprise any suitable and desired register memory provided for the programmable execution unit. The register memory should be (and in an embodiment is) local to (on-chip with) the programmable execution unit. It should (and in an embodiment does) comprise a plurality of registers, each operable to store a respective amount of data, i.e. a "register file" or "register bank".

The graphics processing unit should be (and in an embodiment is) arranged such that the programmable execution unit can read data from and write data to (the registers of) the register memory, e.g. according to a load instruction or a store instruction (of a graphics processing program). The register memory should be (and in an embodiment is) accessible by the programmable execution unit in a synchronous manner (i.e. such that the execution of a thread addressing the register memory does not continue until the read or write operation has been completed). Thus, the register memory is in an embodiment a synchronous memory.

The registers of the register memory are assignable (and in an embodiment are assigned) to respective individual execution threads that are being (or that are to be) executed by the programmable execution unit, i.e. so as to be addressable only by their respective assigned thread as it executes. In other words, respective registers of the register memory are operable and configured to store data associated with an (respective) individual execution thread that is being executed by the execution unit, and the data stored in a register or registers associated with an individual execution thread is accessible only to the associated individual execution thread as that thread executes (and not to other execution threads). Accordingly, the register memory acts as, and is in an embodiment, a per-thread memory, i.e. comprises separate memory (storage) per thread.

The external memory (where present) may comprise any suitable and desired external memory. It is in an embodiment a main memory of the overall graphics (data) processing system that the graphics processing unit is part of. The external memory should be (and in an embodiment is) non-local to (off-chip from) the programmable execution unit.

The external memory should be (and in an embodiment is) accessible by any or all of the threads executed by the programmable execution unit, i.e. any (and all) execution threads can access the external memory as they execute.

The graphics processing unit is in an embodiment arranged such that the programmable execution unit (an execution thread) can store (write) data in the external memory, e.g. and in an embodiment, according to a store instruction (of a graphics processing program). The graphics processing unit is in an embodiment also arranged such that the programmable execution unit (an execution thread) can load (read) data from the external memory, e.g., and in an embodiment, according to a load instruction (of a graphics processing program).

This may be achieved in any suitable and desired manner, but in an embodiment, the graphics processing unit is arranged such that the programmable execution unit can read data from and write data to the external memory via the register memory. In an embodiment, in response to (a thread executing) an external memory load instruction (in the graphics processing program) data is read from the external memory and loaded into the register memory (e.g. for the execution thread in question), and/or in response to (a thread executing) an external memory store instruction (in the graphics processing program) data is written from the register memory (e.g. for the execution thread in question) to the external memory.

To facilitate reading data from and writing data to the external (main) memory, the graphics processing unit of the technology described herein in an embodiment further comprises an external (main) memory load/store unit operable to load data from and store data in the external (main) memory.

The external memory is in an embodiment accessible by threads being executed by the programmable execution unit in an asynchronous manner (i.e. such that the execution of a thread reading from or writing to the external memory does not wait until the read or write operation has been completed). In this regard, the main memory load/store unit in an embodiment comprises a queue for queuing (buffering) main memory load and write requests (that are e.g. generated in response to main memory load and store instructions).

The further local memory may comprise any suitable and desired memory that is operable to store data for use in common by plural execution threads that are being executed by the execution unit, where the stored data is accessible to plural execution threads as they execute. Thus, a given data entry in the further local memory will be, and is in an embodiment able to be, accessed by plural execution threads that are being executed by the execution unit. The further local memory should be (and in an embodiment is) local to (on-chip with) the programmable execution unit.

The further local memory is in an embodiment a Random Access Memory (RAM). In an embodiment the further local memory is a fast access RAM. Thus, according to an embodiment, data values stored in the further local memory are directly available (accessible) as inputs to instructions (in a graphics processing program) being executed by execution threads, i.e. in order for an execution thread to access a data value in the further local memory, a separate instruction is not required in order to firstly transfer the data value from the further local memory into the thread's register before the thread can access the value.

The further local memory in an embodiment comprises a single-ported memory, i.e. a memory having only a single input/output port. The provision of only a single port reduces the power requirements for the further local memory.

As discussed above, in the technology described herein, the execution unit can store output data (for a thread) in the further local memory, e.g., and in an embodiment, according to a store instruction (in a graphics processing program). In an embodiment, in response to (a thread executing) a further local memory store instruction (in the graphics processing program), data is written to the further local memory (via its single port). Where the data to be written to the further local memory is present (stored) in the register memory (e.g. since it is the result of the thread executing one or more earlier instructions in the graphics processing program), the data is in an embodiment written to the further local memory from the register memory (e.g. for the execution thread in question). However, more generally the data may be written to the further local memory from any suitable and desired place in which it is present, such as, for example, from the programmable execution unit (e.g. where the data comprises an (immediate) operand to the store instruction), or a temporary register in the programmable execution unit.

The output data that is stored in the further local memory may comprise any suitable such output data for an execution thread. In an embodiment, the output that is stored in the further local memory is output data that is to be subsequently used in common by (read by) plural execution threads to be executed by the execution unit.

As well as being able to store data for a thread in the further local memory, the programmable execution unit can in an embodiment also read data from the further local memory, e.g. according to a load instruction (of a graphics processing program). This may be achieved in any suitable and desired manner, but in an embodiment, in response to (a thread executing) a further local memory load instruction data is read from the further local memory (via the single port). The programmable execution unit is in an embodiment operable to read data directly from the further local memory (i.e., threads being executed by the programmable execution unit are in an embodiment operable to access data directly from the further local memory). However, it would also be possible for the data to be read from the further local memory and loaded into the register memory for the execution thread in question, if desired.

The further local memory should be (and in an embodiment is) readable by threads being executed by the programmable execution unit in a synchronous manner (i.e. such that the execution of a thread reading from the further local memory does not continue until the read operation has been completed).

As well as being able to store data for a thread in the further local memory, the further local memory is in an embodiment also used to store one or more constant values for use by plural execution threads (a group of plural execution threads) being executed by the execution unit. The one or more constant values may comprise, for example, one or more uniform variables, i.e. one or more variables that are defined externally to the graphics processing program in question and so are constant within the graphics processing program.

Accordingly, the graphics processing unit is in an embodiment operable to load (write) one or more constant values for use by (to be read by) plural execution threads in the further local memory (via the single port), e.g. from the external (main) memory, prior to execution of the plural execution threads. To facilitate this, the graphics processing unit of the technology described herein in an embodiment further comprises a preload unit operable to store (to load) in the further local memory one or more constant values (e.g. uniform variables) for use when executing plural execution threads, in an embodiment prior to execution of the plural execution threads.

The storing of data of an execution thread in the further local memory (as the thread is executing) can be achieved in any suitable and desired manner. However since the further local memory is in an embodiment a single-ported memory which can be addressed (read) by execution threads as they are executed by the execution unit in a synchronous manner, simply allowing output data from the execution unit to be written directly to the further local memory could mean that the write operations could conflict with the synchronous read operations and (potentially) cause the execution unit to stall.

Thus, according to an embodiment, the graphics processing unit is arranged such that output data from the execution unit for storing in the further local memory is stored in the further local memory (in an embodiment via the single port of the further local memory) (only) when the execution unit is not (is other than) reading data from the further local memory. This may be achieved in any suitable and desired manner. In an embodiment, the reading of data from the further local memory by (threads being executed by) the execution unit is monitored, and output data from the execution unit (for a thread) is written to the further local memory when it is determined that (a thread or threads being executed by) the execution unit is not (is other than) reading from the further local memory. In other words, further local memory read requests (that are e.g. each generated in response to (a thread executing) a further local memory load instruction) are prioritised over further local memory write requests (that are e.g. each generated in response to (a thread executing) a further local memory store instruction).

As will be appreciated by those having skill in the art, by prioritising further local memory read requests over write requests, write requests may be stalled for an unknown amount of time. To address this, in an embodiment further local memory write requests from the execution unit (e.g. each generated in response to a load instruction) are queued (buffered), as appropriate, e.g. until the output data in question can be written to the further local memory.

Thus, the graphics processing unit of the technology described herein in an embodiment further comprises a further local memory queue operable to queue (to buffer) further local memory write requests (i.e. write requests from the execution unit for the further local memory). In these embodiments, queued write requests may be processed (so as to write the output data in question to the further local memory) when it is determined that the execution unit is not (is other than) reading from the further local memory.

The further local memory queue may be provided as part of (and the graphics processing unit of the technology described herein may further comprise) a further local memory store unit that is operable to store output data from the execution unit (for a thread) in the further local memory. Alternatively, the further local memory queue may be provided as part of a preload unit (as discussed above). In this case, the preload unit is in an embodiment (also) operable to store output data from the execution unit (for a thread) in the further local memory.

It will be appreciated that in these embodiments at least, the graphics processing unit is in an embodiment arranged such that output data from the execution unit (for a thread) can be stored in the further local memory in an asynchronous manner (i.e. such that the execution thread in question does not wait until the write operation has been completed).

As well as the components and units discussed above, the graphics processing unit can, and in an embodiment does, comprise any other components and units that a graphics processing unit may comprise. Thus, for example, the graphics processing unit of the technology described herein in an embodiment also comprises at least a rasteriser. The rasteriser is in an embodiment operable to rasterise graphics primitives to be rendered to produce graphics fragments to be rendered.

Thus, the rasteriser will in an embodiment test primitives to be rendered against sampling positions of the render output being generated, and generate fragments to be rendered for each sampling position (or respective set of sampling positions (e.g. each 2×2 quad of sampling positions)) that is covered by (or that includes at least one sampling position that is covered by) the primitive in question, with the fragments that are generated by the rasteriser for rendering a primitive then being sent onwards for processing. Each fragment will accordingly correspond to and be used to render a set of sampling positions (with each set of sampling positions comprising one sampling position or plural sampling positions, depending upon whether the fragments represent individual sampling positions or sets, e.g. quads, of plural sampling positions).

The graphics processing unit of the technology described herein in an embodiment also comprises a thread group generator. The thread group generator is in an embodiment operable to initialise and generate groups of plural execution threads, e.g. in respect of plural graphics fragments.

In an embodiment, the thread group generator is operable to cause one or more constant values for (a group of) plural execution threads to be executed to be stored in the further local memory, e.g. by causing a pre-load unit to load the one or more constant values from external (main) memory, i.e. prior to the execution of the plural execution threads.

The graphics processing unit of the technology described herein in an embodiment also comprises a thread generator or thread spawner. The thread generator is in an embodiment operable to generate individual execution threads of a group of plural execution threads for execution by the programmable execution unit, e.g. for rendering each of plural graphics fragments.

The graphics processing unit of the technology described herein in an embodiment also comprises a thread scheduler operable to control the timing of the execution of the threads (e.g. generated by the thread generator). To do this, the thread scheduler is in an embodiment operable to issue each of the plural execution threads to the programmable execution unit for execution, e.g. at the appropriate time. As will be described further below, the thread scheduler may cause the execution of one or more threads to be initialised before the execution of one or more other threads, at the same time as one or more other threads, and/or after the execution of one or more other threads has been completed.

The graphics processing program executed by the execution unit may be any desired program. The graphics processing program should (and in an embodiment does) comprise a sequence of instructions to be performed when executing the graphics processing program.

The graphics processing program is in an embodiment a graphics shader program, such as, e.g. a vertex shader, a fragment shader, or a compute shader. In these embodiments, the plural execution threads in an embodiment represent appropriate "work items" for the shader program in question. Thus they may, for example, represent vertices for a vertex shading program, or sampling points (or pixels) for a fragment shading program, etc.

As discussed above, the programmable execution unit is operable to selectively store output data for an execution thread in a register or registers of the register memory assigned to the execution thread, the further local memory, and optionally the external memory when the thread executes the graphics processing program. The programmable execution unit should be (and in an embodiment is) operable to store output data for an execution thread in a particular memory in response to the thread executing a corresponding store instruction in the graphics processing program being executed by the thread.

Thus, in an embodiment, the graphics processing program to be executed by the programmable execution stage for a thread or threads includes one or more store instructions, where each store instruction is in an embodiment configured to cause the associated output data to be stored in the desired memory.

In an embodiment, a graphics processing program to be executed by a thread includes one or more of, and in an embodiment all of:

one or more further local memory store instructions, where each further local memory store instruction is configured such that when an execution thread executes (processes) that instruction, associated output data is stored in the further local memory;

one or more register memory store instructions, where each register memory store instruction is configured such that when an execution thread executes (processes) that instruction, associated output data is stored in a register or registers of the register memory assigned to the execution thread; and one or more external memory store instructions, where each external memory store instruction is configured such that when an execution thread executes (processes) that instruction, associated output data is stored in the external memory.

Correspondingly, the graphics processing program to be executed by the programmable execution stage for a thread or threads in an embodiment includes one or more load instructions, where each load instruction is in an embodiment configured to cause the associated data to be read from the desired memory (for use by the thread).

In an embodiment, the graphics processing program to be executed by a thread includes one or more of, and in an embodiment all of:

one or more further local memory load instructions, where each further local memory load instruction is configured such that when an execution thread executes (processes) that instruction, associated data is read from the further local memory (for use by the thread);

one or more register memory load instructions, where each register memory load instruction is configured such that when an execution thread executes (processes) that instruction, associated data is read from a register or registers of the register memory assigned to the execution thread (for use by the thread); and one or more external memory load instructions, where each external memory load instruction is configured such that when an execution thread executes (processes) that instruction, associated data is read from the external memory (for use by the thread).

Correspondingly, in an embodiment, the method comprises the programmable execution unit when executing a graphics processing program for an execution thread to perform graphics processing operations, in response to a store instruction, storing associated output data for the execution thread in the desired memory.

The method in an embodiment comprises one or more of, and in an embodiment all of:

the programmable execution unit when executing a graphics processing program for an execution thread to perform graphics processing operations, in response to a further local memory store instruction, storing associated output data in the further local memory;

the programmable execution unit when executing a graphics processing program for an execution thread to perform graphics processing operations, in response to a register memory store instruction, storing associated output data in a register or registers of the register memory assigned to the execution thread; and the programmable execution unit when executing a graphics processing program for an execution thread to perform graphics processing operations, in response to an external memory store instruction, storing associated output data in the external memory.

Correspondingly, in an embodiment, the method comprises the programmable execution unit when executing a graphics processing program for an execution thread to perform graphics processing operations, in response to a load instruction, reading associated data from the desired memory (for use by the thread).

In an embodiment, the method comprises one or more of, and in an embodiment all of:

the programmable execution unit when executing a graphics processing program for an execution thread to perform graphics processing operations, in response to a further local memory load instruction, reading associated data from the further local memory (for use by the thread);

the programmable execution unit when executing a graphics processing program for an execution thread to perform graphics processing operations, in response to a register memory load instruction, reading associated data from a register or registers of the register memory assigned to the execution thread (for use by the thread); and the programmable execution unit when executing a graphics processing program for an execution thread to perform graphics processing operations, in response to an external memory load instruction, reading associated data from the external memory (for use by the thread).

The graphics processing program that is to be executed by the execution threads may be configured to include appropriate memory store and load instructions in the manner discussed above in any desired and suitable manner.

In an embodiment, the program code for the graphics program in question is analysed, and then appropriate load and/or store instructions are included in the form of the program that is provided to the graphics processing unit for execution.

In an embodiment, the graphics processing system includes processing circuitry operable to configure the sequence of instructions of the graphics processing program appropriately and as desired, e.g. by inserting appropriate load and store instructions in the graphics processing program, or by modifying existing instructions, where appropriate.

This processing circuitry is in an embodiment programmable processing circuitry that can be programmed to operate in the manner required. In an embodiment this processing circuitry is part of (and thus these operations are performed on) a host processor of the graphics processing system. Thus, in an embodiment, the processing circuitry comprises appropriate processing circuitry, e.g. a CPU, of the host processor of the overall graphics processing system that the graphics processing unit is part of.

In an embodiment, the configuring of the sequence of instructions of the graphics processing program to include the desired load and store operations is performed by a compiler of the graphics processing system (and for the graphics processing unit). Thus, in an embodiment, compiler processing circuitry (a compiler) of the graphics processing system is operable to configure the sequence of instructions of the graphics processing program appropriately as desired, e.g. by inserting appropriate load and store instructions in the graphics processing program, or modifying existing instructions, where appropriate. Any suitable compiler for the graphics processing unit may perform these operations, e.g., depending upon the graphics processing program in question. In an embodiment, the compiler for the shader in question (i.e. that the graphics processing program relates to) performs these operations.

In an embodiment, expressions in the graphics processing program, e.g. for which it would be appropriate or desirable for the results to be stored in a particular memory, are identified, and then appropriate store instructions are included in the graphics processing program (e.g. either by inserting new instructions or modifying existing instructions), i.e. such that when an execution thread executes (processes) that instruction, the expression result or results is stored in that particular memory. Correspondingly, appropriate load instructions can in an embodiment be included in the graphics processing program, i.e. such that when an execution thread executes (processes) that instruction, the result or results is read from the desired memory for use by the thread.

In an embodiment, expressions in a graphics processing program, e.g. for which it would be appropriate or desirable for the results to be stored in the further local memory (such as, and in an embodiment, expressions whose results are to be used in common by plural threads) are identified, and appropriate further local memory store instructions are then included in the graphics processing program, i.e. such that when an execution thread executes (processes) that instruction, the result or results is stored in the further local memory. Correspondingly, further local memory load instructions can in an embodiment be included in the graphics processing program, i.e. such that when an execution thread executes (processes) that instruction, the (common) expression result or results is read from the further local memory for use by the thread.

Correspondingly, in an embodiment, expressions in the graphics processing program for which it would be appropriate or desirable for the results to be stored in the register memory (such as expressions whose results are to be used only by the thread that is executing) and/or in the external memory (such as expressions whose results are to be used by subsequent threads or processes (e.g. a final result or results of a thread)) are identified, and appropriate load and/or store instructions are then included in the graphics processing program.

The technology described herein also extends to such compiler operation and to the compiler itself.

Thus, another embodiment of the technology described herein comprises a compiler that compiles programs to generate instructions for a programmable execution unit of a graphics processing unit that executes instructions to perform graphics processing operations, the graphics processing unit comprising:

a local register memory comprising one or more registers, respective registers of the register memory being assignable to store data associated with an individual execution thread that is being executed by the execution unit, the register or registers assigned to an individual execution thread being, while that thread executes, accessible only to that associated individual execution thread; and a further local memory operable to store data for use in common by plural execution threads that are being executed by the execution unit, the data stored in the further local memory being accessible to plural execution threads as they execute;

wherein the compiler is configured to, for a graphics processing program to be executed by the programmable execution unit:

identify expressions in the graphics processing program whose results are to be used in common by plural execution threads; and when an expression in the graphics processing program whose result is to be used in common by plural execution threads is identified, include a further local memory store instruction in the graphics processing program, such that when an execution thread executes that instruction, the result or results is stored in the further local memory.

Another embodiment of the technology described herein comprises a method of compiling a program to generate instructions for a programmable execution unit of a graphics processing unit that executes instructions to perform graphics processing operations, the graphics processing unit comprising:

a local register memory comprising one or more registers, respective registers of the register memory being assignable to store data associated with an individual execution thread that is being executed by the execution unit, the register or registers assigned to an individual execution thread being, while that thread executes, accessible only to that associated individual execution thread; and a further local memory operable to store data for use in common by plural execution threads that are being executed by the execution unit, the data stored in the further local memory being accessible to plural execution threads as they execute;

the method comprising, for a graphics processing program to be executed by the programmable execution unit:

identifying expressions in the graphics processing program whose results are to be used in common by plural execution threads; and when an expression in the graphics processing program whose result is to be used in common by plural execution threads is identified, including a further local memory store instruction in the graphics processing program, such that when an execution thread executes that instruction, the result or results is stored in the further local memory.

As will be appreciated by those skilled in the art, these embodiments of the technology described herein can and in an embodiment do include any one or more or all of the optional features of the technology described herein, as appropriate.

The compiler may, e.g., and in an embodiment does, run on a host processor of the overall data processing system that includes the graphics processing unit (with the graphics processing unit then being on another processor that is associated with the host processor (such that the compiler and compiled code run on separate processors within the overall data (graphics) processing system)). However, other arrangements would be possible, such as the compiler running on the same processor as the compiled code, or the compiler being run on a (completely) separate processor, such as the program being precompiled on a separate system and being distributed in a compiled form.

As well as a graphics processing program that is to be executed by the graphics processing unit being configured (e.g. by the compiler) to include appropriate load and store instructions as discussed above, in an embodiment, a graphics processing program to be executed is also configured such that the order of the operations that it performs is (made) more appropriate for the operations that are being performed, and in particular to facilitate the more efficient use, e.g., of the ability to store data in (and load data from) the further local memory.

Thus, in an embodiment the graphics processing (shader) program is arranged such that "common" operations (expressions) (i.e. expressions (operations) that will produce the same value(s) each time they are executed for some or all of the threads in a set of threads that are executing the shader program) are arranged to be executed at or near the beginning of the shader program, with the "non-common" or "per-thread" operations (expressions) (i.e. that will (potentially) produce a different value(s) for each thread in a set of threads that are executing the shader program) then being performed later in the (shader) program.

Thus, the graphics processing (shader) program is in an embodiment arranged such that (the instructions for) any graphics processing (shader) program expressions (operations) that will produce a common (the same) result for all the threads (work items) of a group of threads (work items) that the graphics processing (shader) program is to be executed for appear earlier in (and in an embodiment at the beginning of) the execution order of the graphics processing (shader) program, any (instructions for) graphics processing (shader) program expressions (operations) that are (definitely) required to be executed for each thread (work item) individually (i.e. that potentially will produce a different result for each individual thread (work item)) appear towards the end of the graphics processing (shader) program execution (and at least after some, and in an embodiment after all, of the (instructions for) graphics processing (shader) program expressions (operations) that will produce common results for plural threads (work items)).

In an embodiment, where the (shader) program includes expressions that operate on run time constant inputs, the (shader) program is arranged such that run time constant expressions appear before other, i.e. run time non-constant, expressions. The expressions that operate on run time constant inputs may be any suitable and desired such expressions, such as expressions that refer to "uniform variables" (in a GLSL shader program) and samplers having no varying input.

The graphics processing (shader) program may be arranged in this manner by any suitable and desired element of the overall data processing system.

In an embodiment, the graphics processing (shader) program is arranged by the compiler (the shader compiler) for the graphics processing unit. Thus the compiler in an embodiment arranges the graphics processing (shader) program. In an embodiment, the compiler is operable to (where possible) re-order expressions (operations) in the graphics processing (shader) program so as to, e.g., arrange "common" operations (expressions) at or near the beginning of the graphics processing (shader) program, with the "non-common" or "per-thread" operations (expressions) later in the (shader) program.

In this regard, the compiler in an embodiment operates to place (the instructions for) any graphics processing (shader) program expressions (operations) that will produce a common (the same) result for all the threads (work items) of a group of threads (work items) that the graphics processing (shader) program is to be executed for earlier in (and in an embodiment at the beginning of) the execution order of the graphics processing (shader) program.

Correspondingly, the compiler in an embodiment places any (instructions for) graphics processing (shader) program expressions (operations) that are (definitely) required to be executed for each thread (work item) individually (i.e. that potentially will produce a different result for each individual thread (work item)) towards the end of the graphics processing (shader) program execution (and at least after some, and in an embodiment after all, of the (instructions for) graphics processing (shader) program expressions (operations) that will produce common results for plural threads (work items)).

In an embodiment, the compiler operates to place any graphics processing (shader) program instructions that execute expressions which need to be executed for each work item individually, and which are dependent upon the results of earlier instructions that execute common expressions in the graphics processing (shader) program, after the instructions that execute common expressions in the graphics processing (shader) program (or at least after the instructions that execute common expressions in the graphics processing (shader) program that those instructions are dependent upon). This could comprise, e.g., simply placing the instructions after all the instructions in the graphics processing (shader) program that execute common expressions, or the arrangement could be such that the instructions are at least placed after the instructions that execute the common expressions that those instructions are dependent upon.

Correspondingly, in an embodiment, where the graphics processing (shader) program includes instructions that execute expressions which need to be executed for each work item individually, but which are not dependent upon the results of earlier instructions that execute common expressions in the graphics processing (shader) program, then those instructions which are not dependent upon the results of earlier instructions that execute common expressions in the graphics processing (shader) program are in an embodiment arranged to occur in the sequence of instructions for the graphics processing (shader) program after the instructions that execute the common expressions, but before any "per-work item" or "per-thread" instructions that are dependent upon the common expressions.

The plural execution threads may execute the graphics processing (shader) program in any manner as desired. The graphics processing program should be (and in an embodiment is) performed in respect of each of the plural execution threads, that are, e.g. issued to the execution unit by the thread scheduler.

In one embodiment, a single "pilot thread" is issued to the execution unit in respect of (the instructions for) the "common" operations (expressions), which may be e.g. arranged in a "pilot shader", and then plural "main threads" are issued to the execution unit in respect of (the instructions for) the "non-common" per-thread operations (expressions), which may be e.g. arranged in a "main shader", e.g. in accordance with the Applicants' earlier UK patent application no. GB A 2516358.

Thus, according to an embodiment, the graphics processing unit is configured to:

issue a pilot thread that executes (the instructions for) graphics processing (shader) program expressions (operations) that will produce a common (the same) result for all the threads (work items) of a group of threads (work items) that the graphics processing (shader) program is to be executed for, in an embodiment so as to generate and store the output values for those expressions; and subsequently issue plural main threads that execute (the instructions for) graphics processing (shader) program expressions (operations) that are (definitely) required to be executed for each thread (work item) individually (i.e. that potentially will produce a different result for each individual thread (work item)).

In another embodiment, the execution threads for which the graphic processing (shader) program is to be executed may be arranged to be able to start their execution of the program at different starting (entry) points in the program (in the sequence of instructions for the graphic processing (shader) program).

In an embodiment, the graphics processing unit is configured to:

issue one or more execution threads that execute the graphics processing (shader) program starting at the start of the graphics processing (shader) program (i.e. at the first instruction in the sequence of instructions for the graphics processing (shader) program, and from which a thread may be correctly executed to completion, without, for example, relying on data output by any other thread), in an embodiment so as to generate and store the output values for (at least) the common expressions; and issue one or more other execution threads that execute the graphics processing (shader) program starting at a point in the sequence of instructions for the graphics processing (shader) program after some, and in an embodiment after all, of the instructions in the graphics processing (shader) program that calculate common expressions in the graphics processing (shader) program (i.e. that will produce the same result for each thread (work item) in the set of plural threads (work items) in question), in an embodiment after all the (and in an embodiment immediately after all the) instructions that perform common expressions in the graphics processing (shader) program.

In this embodiment, different execution threads for which the graphics processing (shader) program is to be executed can start executing instructions in the graphics processing (shader) program at different start points. In other words, the graphics processing (shader) program has plural possible "start" ("entry") points for execution threads, such that threads can start their execution of the graphics processing (shader) program at different points within the graphics processing (shader) program.

By allowing some threads to be able to execute the graphics processing (shader) program from the beginning (and thereby, e.g., perform the common operations in the graphics processing (shader) program), with other threads being arranged to start their execution of the graphics processing (shader) program at a later point (thereby, e.g., and in an embodiment, avoiding executing the common operations for those threads), the number of threads for which the "common" operations (expressions) are performed can be reduced, thereby making overall execution of the graphics processing (shader) program more efficient.

However, this embodiment does not require the generation and execution of a separate "pilot shader" program to do this, and therefore avoids issues that can arise with executing pilot shader programs, such as the fact that the pilot shader may execute only on a single thread (and therefore be relatively inefficient on typically massively multi-threaded graphics processing pipeline architectures).

In these embodiments (where an initial pilot thread is executed before plural main execution threads or where there are multiple thread entry points in the graphic processing (shader) program), the threads executing (the instructions for) graphics processing (shader) program expressions (operations) that are (definitely) required to be executed for each thread (work item) individually may comprise (where necessary) loading the stored output values generated by the common expressions for processing.

Accordingly, the results (data value(s)) that are generated by execution of (the instructions for) the common expressions in the graphics processing (shader) program should be, and are in an embodiment, made available for use to other threads that are executing the graphics processing (shader) program (and in particular to the "main threads" or the (other) threads that start the graphics processing (shader) program at a later point and thus do not themselves execute the instructions for the common expressions in question). These common expression results (data values) can be provided for use for other execution threads in any suitable and desired manner.

In an embodiment the common expression results are stored in the further local memory, e.g. so as to be accessible to other execution threads that are executing the graphics processing (shader) program. As discussed above, the further local memory is particularly suited to storing such data, since it can be addressed in a synchronous manner, and it can be accessed by all of the threads being executed by the programmable execution unit. The common expression results are in an embodiment stored in the further local memory by the execution unit sending a write request (e.g. according to a store instruction) (to the further local memory store unit or the preload unit) via the further local memory queue, e.g. as discussed above.

Thus, the graphics processing program in an embodiment includes one or more further local memory store instructions in respect of the common expression results, i.e. configured such that when an execution thread executes (processes) that instruction, a common expression result or results is stored in the further local memory. Correspondingly, the graphics processing program in an embodiment includes one or more further local memory load instructions in respect of the common expression results, i.e. configured such that when an execution thread executes (processes) that instruction, a common expression result or results is read from the further local memory for use by the thread.

The results (data value(s)) that are generated by execution of (the instructions for) the common expressions should be (and in an embodiment are) made available (stored in the further local memory) for use by other threads that are executing the graphics processing (shader) program (and in particular to the "main threads" or the (other) threads that start the graphics processing (shader) program at a later point and thus do not themselves execute the instructions for the common expressions in question) before the other threads require those results. This may be achieved in any suitable and desired manner.

In an embodiment, the other threads that are executing the graphics processing (shader) program (and in particular the "main threads" or the (other) threads that start the graphics processing (shader) program at a later point and thus do not themselves execute the instructions for the common expressions in question) are issued to the execution unit (by the thread scheduler) after the results (data value(s)) that are generated by execution of the common expressions should be (and in an embodiment are) made available (e.g. stored in the further local memory) for use by other threads.

To facilitate this, in an embodiment, the fact that the common expression results (data values) have been made available (e.g. have been stored in the further local memory (and are therefore available for synchronous access by other execution threads)) for use by other threads is communicated to the thread scheduler (and the thread scheduler is in an embodiment then operable to appropriately schedule the execution of the plural execution threads in response to this). This may be done in any suitable and desired manner. In an embodiment, a message indicating the fact that the common expression results (data values) have been made available is sent, e.g. from the further local memory store unit or the preload unit, to the thread scheduler. Other arrangements would, of course, be possible.

Accordingly, in embodiments where an initial pilot thread is executed before plural main execution threads, the storing of the results (data value(s)) that are generated by the execution of the pilot thread is in an embodiment monitored, and when the results have been successfully stored in the further local memory (and are therefore available for synchronous access by the plural main threads), this fact is in an embodiment communicated to the thread scheduler, e.g. by the further local memory store unit or the preload unit sending a message indicating this fact to the thread scheduler. The thread scheduler in an embodiment then causes the plural main execution threads to be issued to the execution unit in response to this, as appropriate.

Correspondingly, in embodiments where there are multiple thread entry points in the graphic processing (shader) program, the storing of the results (data value(s)) that are generated by the execution of the common expressions is in an embodiment monitored, and when the results have been successfully stored in the further local memory (and are therefore available for synchronous access by the plural main threads), this fact is in an embodiment communicated to the thread scheduler, e.g. by the further local memory store unit or the preload unit sending a message indicating this fact to the thread scheduler. The thread scheduler may then cause subsequent threads to enter the graphic processing (shader) program at a different entry point, e.g. so as to skip the common expressions.

In these embodiments, an execution thread can be configured to be able to start execution of the shader program at a later stage in the shader program in any suitable and desired manner. For example, threads could be allocated different initial program counter-values to set their different "entry points" to the shader program (and in one embodiment this is done). In this case, the different start points within the shader program could be indicated by means of different absolute program counter-values, or there could be one program counter-value that, e.g., indicates a first start point in the shader program, with an offset or offsets to that program counter-value then being used to indicate and trigger other start points within the shader program.

Additionally or alternatively, instructions that correspond to common expressions in the graphics processing (shader) program, that are only to be executed if the thread starts at the beginning of the shader program could be denoted (e.g. flagged) as such, with the execution threads correspondingly being configured so as to either execute those instructions or not, as appropriate.

For example, instructions that correspond to common expressions could be denoted as such, with execution threads then determining whether the results for those instructions have already been stored or not (e.g. by probing the validity of corresponding stored data or checking a flag or other indication that indicates whether the results for those instructions have already been stored or not) when they encounter a marked "common expression" instruction, and either executing the "common expression" instruction when it is determined that the results of those instructions have not yet been stored, or skipping (omitting) those instructions when it is determined that the common expression results has been stored by another thread.

The execution threads themselves could also or instead be configured to execute (or not execute) particular instructions in the shader program. For example, a thread could be denoted as being a thread that will (and should) execute instructions that correspond to common expressions (or vice-versa).

The execution threads can be caused to start their execution of the shader program at different starting points in the shader program in any suitable and desired manner.

For example, the execution threads could be initially issued to begin their execution at the beginning of the graphics processing (shader) program, until one execution thread retires (completes the graphics processing (shader) program) and the common expression results (data values) are stored in the further local memory, with any execution threads that are issued thereafter then being configured to start the graphics processing (shader) program at a later start point (e.g. after (the instructions for) the common expressions in the graphics processing (shader) program). In this case, it would be possible to execute a single thread that starts at the beginning of the graphics processing (shader) program, with all other threads starting at a or the later start point in the graphics processing (shader) program and being blocked (or not issued) until the first thread has completed and the common expression results (data values) have been stored in the further local memory, or, alternatively, threads that start at the beginning of the graphics processing (shader) program could be continuously issued until one thread completes and the common expression results (data values) are stored in the further local memory, with threads issued thereafter then having a later start point.

In an embodiment, where the execution of instructions at later points in the graphic processing (shader) program is dependent upon the storing of results in respect of earlier instructions in the graphics processing (shader) program, then rather than waiting for a first thread to complete the shader program and for the common expression results to be stored before beginning execution of the threads that are to start later in the graphics processing (shader) program, the storing of the results in respect of particular instructions or sets of instructions in the graphics processing (shader) program by (earlier) threads is tracked and monitored, and when the result(s) in respect of a relevant instruction or set of instructions is stored, then threads that are to begin the graphics processing (shader) program at a later start point are related for execution.

Thus, in an embodiment, instructions or groups of plural instructions in the graphics processing (shader) program are indicated as being dependent upon the storing of the common expressions results (data values) by a thread, and threads that start the graphics processing (shader) program after (the instructions for) the common expressions in the graphics processing (shader) program (but before the instruction(s) or set(s) of plural instructions that are dependent upon the common expressions) are only allowed to begin executing the instruction(s) or set(s) of plural instructions in question once the common expressions results (data values) have been stored.

The dependencies of later instructions on the common expression results could be tracked and used at any desired level of granularity (resolution) within the graphics processing (shader) program.

For example, there could simply be a dependency that requires all the results that relate to common expressions to be stored before the dependencies are considered to be (and indicated as being) met.

Alternatively or additionally, the dependency could be set at the level of individual results that relate to individual common expressions, with later instructions that depend upon the particular common expression result(s) in question then being allowed to be executed when the earlier common expression result(s) in question has been stored.

In these embodiments, where multiple threads that start at the beginning of the graphics processing (shader) program are issued, each thread will generate one or more further local memory write requests in respect of the common expression results (data values). As discussed above, each of the further local memory write requests is in an embodiment queued (buffered) in the further local memory queue. Thus, there may be multiple (potentially) identical (corresponding) write requests in respect of the common expression results queued in the further local memory queue.

In one embodiment, each of the multiple identical (corresponding) write requests is processed as normal by the further local memory store unit or preload unit, i.e. each write request is processed so as to store one or more values in the further local memory. In this case, the multiple identical (corresponding) write requests are in an embodiment configured to write to the same memory address, i.e. the multiple identical write requests may be merged to the same memory address. This is possible since, for example, the common expression results will, by definition, be identical.

However, in an embodiment, the further local memory store unit or preload unit and/or the further local memory queue is operable to (identify and) discard write requests that are identical to (that correspond to) write requests that have already been processed. This can then reduce the number of write operations, and therefore the power requirements of the system further.

As will be appreciated by those skilled in the art, the graphics processing unit of the technology described herein will be part of an overall graphics processing system that will include, e.g., and in an embodiment, a host processor that, e.g., executes applications that require graphics processing by the graphics processing unit. The host processor will send appropriate commands and data to the graphics processing unit to control it to perform graphics processing operations and to produce graphics processing (render) output required by applications executing on the host processor. To facilitate this, the host processor should, and in an embodiment does, also execute a driver for the graphics processing unit and a compiler or compilers for compiling shader programs to be executed by the programmable execution unit of the graphics processing unit.

The graphics processing unit may also comprise, and/or be in communication with, one or more memories and/or memory devices that store the data described herein, and/or the output data generated by the graphics processing unit, and/or store software for performing the processes described herein. The graphics processing unit may also be in communication with a host microprocessor, and/or with a display for displaying images based on the data generated by the graphics processing unit.

Thus, a further embodiment of the technology described herein comprises a graphics processing system comprising:
- a host processor;
- a main memory; and
- a graphics processing unit, the graphics processing unit comprising:
  - a programmable execution unit operable to execute graphics processing programs for execution threads to perform graphics processing operations;
  - a local register memory comprising one or more registers, respective registers of the register memory being operable to store data associated with an individual execution thread that is being executed by the execution unit, the register or registers associated with an individual execution thread being accessible only to the associated individual execution thread as that thread executes; and
  - a further local memory operable to store data for use in common by plural execution threads that are being executed by the execution unit, the data stored in the further local memory being accessible to plural execution threads as they execute;
  - wherein the programmable execution unit is operable to selectively store output data for an execution thread in a register or registers of the register memory assigned to the execution thread, the further local memory, and the main memory.

As will be appreciated by those skilled in the art, these embodiments of the technology described herein can and in an embodiment do include one or more, and in an embodiment all, of the optional features of the technology described herein.

The programmable execution unit(s) of the graphics processing unit that executes the graphics processing (shader) program(s) may, and in an embodiment does, function (operate) as (the graphics processing pipeline may include) any suitable and desired graphics processing shader stage (shaders), such as a vertex shader, a geometry shader, fragment shader, compute shader, etc. In an embodiment it can operate as each of these shaders.

The or each programmable execution unit of the graphics processing unit may comprise any suitable programmable hardware element such as programmable processing circuitry. Each programmable processing stage may be provided as a separate circuit element to other programmable stages of the processing unit or the programmable processing stages may share some or all of their programmable processing circuitry (that is then differently programmed to serve as the desired programmable processing stage).

As well as any programmable processing (shader) stages, the graphics processing pipeline may also contain any other suitable and desired processing stages that a graphics processing unit may contain such as a rasteriser, an early depth (or an early depth and stencil) tester, a late depth (or depth and stencil) tester, a blender, a tile buffer, a write out unit, etc.

The technology described herein can be used for all forms of output that a graphics processing unit may be used to generate, such as frames for display, render to texture outputs, etc. The output, e.g. fragment shaded, data values from the graphics processing are in an embodiment exported to external, e.g. main, memory, for storage and use, such as to a frame buffer for a display.

The technology described herein is applicable to any suitable form or configuration of graphics processor. It is particularly applicable to tile based graphics processors and graphics processing systems. Thus in an embodiment, the graphics processing system and graphics processing unit are a tile-based system and unit, respectively.

In an embodiment, the various functions of the technology described herein are carried out on a single graphics processing platform that generates and outputs the rendered fragment data that is, e.g., written to the frame buffer for the display device.

Although the technology described herein has been described above with particular reference to the execution of graphics processing (shader) programs in graphics processing units, the Applicants have recognised and believe that the operation in the manner of the technology described herein and the techniques of the technology described herein may be equally applicable to and can be used in other, e.g. and in an embodiment multi-threaded, processing units and not just graphics processing units. They, for example, be applied appropriately to more general processors, such as CPUs (Central Processing Units), if desired.

Thus, another embodiment of the technology described herein comprises a processing unit comprising:
- a programmable execution unit operable to execute programs for execution threads to perform processing operations;
- a local register memory comprising one or more registers, respective registers of the register memory being assignable to store data associated with an individual execution thread that is being executed by the execution unit, the register or registers assigned to an individual execution thread being, while that thread executes, accessible only to that associated individual execution thread; and
- a further local memory operable to store data for use in common by plural execution threads that are being executed by the execution unit, the data stored in the further local memory being accessible to plural execution threads as they execute;
- wherein the programmable execution unit is operable to selectively store output data for an execution thread in a register or registers of the register memory assigned to the execution thread, and the further local memory.

Another embodiment of the technology described herein comprises a method of performing processing operations in a processing unit that comprises:
- a programmable execution unit operable to execute programs for execution threads to perform processing operations; and
- a local register memory comprising one or more registers, respective registers of the register memory being assignable to store data associated with an individual execution thread that is being executed by the execution unit, the register or registers assigned to an individual execution thread being, while that thread executes, accessible only to that associated individual execution thread; and
- a further local memory operable to store data for use in common by plural execution threads that are being executed by the execution unit, the data stored in the further local memory being accessible to plural execution threads as they execute;
- the method comprising the programmable execution unit when executing a processing program for an execution thread to perform processing operations, storing output data for the execution thread in the further local memory.

As will be appreciated by those skilled in the art, these embodiments of the technology described herein can and in an embodiment do include any one or more or all of the optional features of the technology described herein, as appropriate.

In these embodiments of the technology described herein, the processing unit can be any suitable processing unit, such as a CPU, or a GPU. Correspondingly, the processing entities that are being processed can be any suitable and desired processing entity, such as a work item that is to be processed.

The technology described herein can be implemented in any suitable system, such as a suitably configured microprocessor based system. In an embodiment, the technology described herein is implemented in a computer and/or micro-processor based system.

In some embodiments, the processor comprises, and/or is in communication with, one or more memories and/or memory devices that store the data described herein, and/or store software for performing the processes described herein. The processor may also be in communication with a host microprocessor, and/or with a display for displaying images based on the data generated by the processor.

The various functions of the technology described herein can be carried out in any desired and suitable manner. For example, the functions of the technology described herein can be implemented in hardware or software, as desired. Thus, for example, unless otherwise indicated, the various functional elements, stages, units, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages and/or units of the technology described herein may be embodied as processing stage and/or processing unit circuitry, e.g., in the form of fixed-function processing circuitry, and/or in the form of programmable processing circuitry that can be programmed to perform the desired operation. Equally, any one or more of the processing stages, units and/or processing circuitry of the technology described herein may be provided as a separate circuit element to any one or more of the other processing stages, units or processing circuitry, and/or any one or more or all of the processing stages, units and processing circuitry may be at least partially formed of shared processing circuitry.

Subject to any hardware necessary to carry out the specific functions discussed above, the data processing system and pipeline can otherwise include any one or more or all of the usual functional units, etc., that data processing pipelines include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

Figures 4, 5:
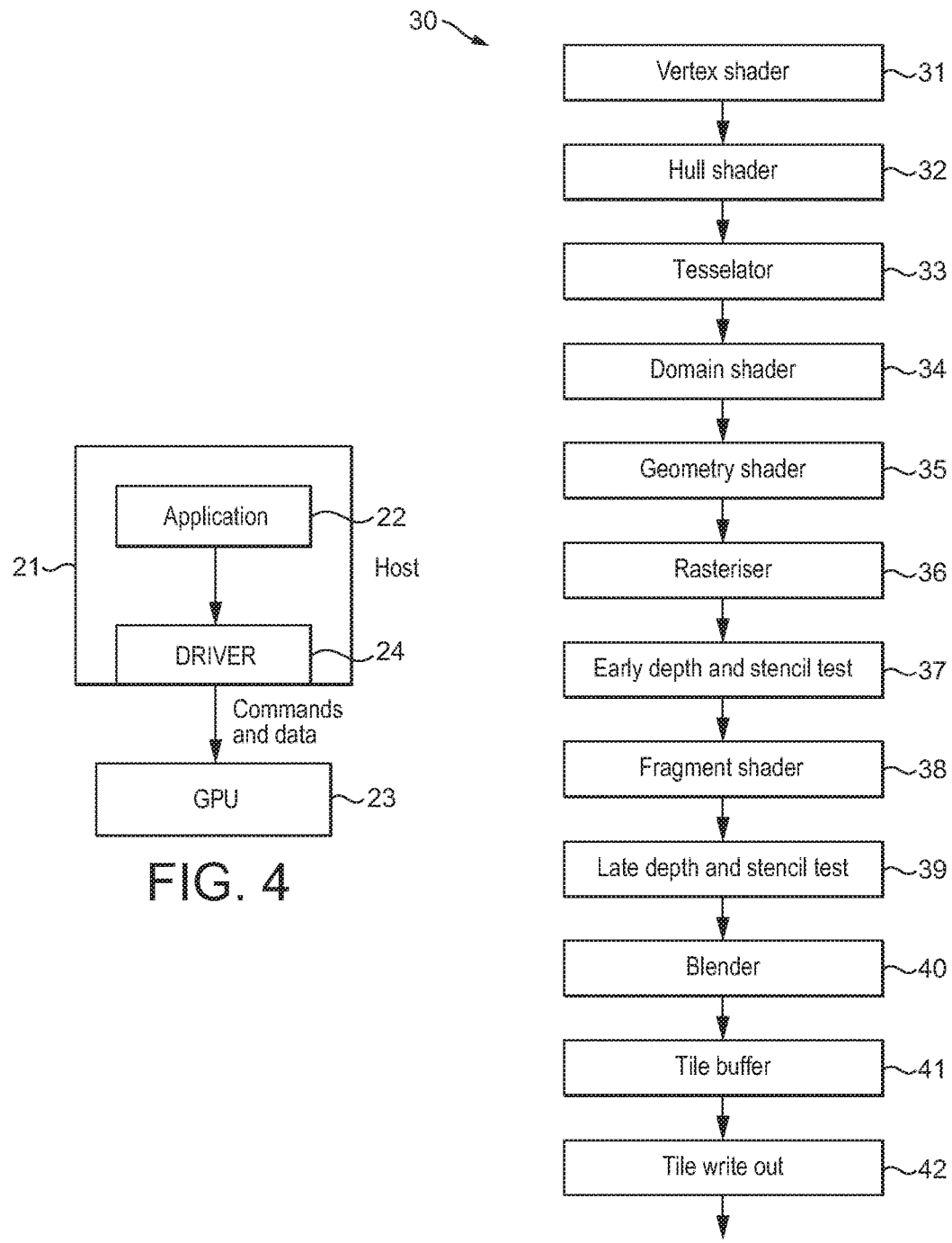
FIG. 4 shows an exemplary computer graphics processing system.
FIG. 5 shows schematically a graphics processing pipeline that can be operated in the manner of the technology described herein.

FIG. 4 shows an exemplary computer graphics processing system.

An application 22, such as a game, executing on a host processor 21 will require graphics processing operations to be performed by an associated graphics pipeline that is implemented by means of a graphics processing unit (GPU)

23. To do this, the application will generate API (Application Programming Interface) calls that are interpreted by a driver 24 for the graphics processing unit 23 that is executed on the host processor 21 to generate appropriate commands to the graphics processor 23 to generate graphics output required by the application 22. To facilitate this, a set of "commands" will be provided to the graphics processor 23 in response to commands from the application 22 running on the host system 21 for graphics output (e.g. to generate a frame to be displayed).

FIG. 5 shows the graphics processing pipeline 30 of the graphics processing unit 23 in more detail.

The graphics processing pipeline 30 shown in FIG. 5 is a tile based renderer and will thus produce tiles of a render output data array, such as an output frame to be generated.

(In tile based rendering, rather than the entire render output, e.g., frame, effectively being processed in one go as in immediate mode rendering, the render output, e.g., frame to be displayed, is divided into a plurality of smaller sub regions, usually referred to as "tiles". Each tile (sub region) is rendered separately (typically one after another), and the rendered tiles (sub regions) are then recombined to provide the complete render output, e.g., frame for display. In such arrangements, the render output is typically divided into regularly sized and shaped sub regions (tiles) (which are usually, e.g., squares or rectangles), but this is not essential.)

The render output data array may typically be an output frame intended for display on a display device, such as a screen or printer, but may also, for example, comprise intermediate data intended for use in later rendering passes (also known as a "render to texture" output), etc.

(When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 5 shows the main elements and pipeline stages of the graphics processing pipeline 30 that are relevant to the operation of the present embodiments. As will be appreciated by those skilled in the art there may be other elements of the graphics processing pipeline that are not illustrated in FIG. 5. It should also be noted here that FIG. 5 is only schematic, and that, for example, in practice the shown functional units and pipeline stages may share significant hardware circuits, even though they are shown schematically as separate stages in FIG. 5. It will also be appreciated that each of the stages, elements and units, etc., of the graphics processing pipeline as shown in FIG. 5 may be implemented as desired and will accordingly comprise, e.g., appropriate circuitry and/or processing logic, etc., for performing the necessary operation and functions.

As shown in FIG. 5, the graphics processing pipeline 30 includes a number of stages, including vertex shader 31, a hull shader 32, a tesselator 33, a domain shader 34, a geometry shader 35, a rasterisation stage 36, an early Z (depth) and stencil test stage 37, a renderer in the form of a fragment shading stage 38, a late Z (depth) and stencil test stage 39, a blending stage 40, a tile buffer 41 and a downsampling and writeout (multisample resolve) stage 42.

The vertex shader 31 takes the input data values associated with the vertices, etc., defined for the output to be generated, and processes those data values to generate a set of corresponding "vertex shaded" output data values for use by subsequent stages of the graphics processing pipeline 30. The vertex shading, for example, modifies the input data to take account of the effect of lighting in the image to be rendered.

The hull shader 32 performs operations on sets of patch control points and generates additional data known as patch constants, the tessellation stage 33 subdivides geometry to create higher order representations of the hull, the domain shader 34 performs operations on vertices output by the tessellation stage (similar to a vertex shader), and the geometry shader 35 processes entire primitives such as a triangles, points or lines. These stages together with the vertex shader 32 effectively perform all the necessary fragment frontend operations, such as transformation and lighting operations, and primitive setup, to setup the primitives to be rendered, in response to commands and vertex data provided to the graphics processing pipeline 30.

The rasterisation stage 36 of the graphics processing pipeline 30 operates to rasterise the primitives making up the render output (e.g. the image to be displayed) into individual graphics fragments for processing. To do this, the rasteriser 36 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 37 performs a Z (depth) test on fragments it receives from the rasteriser 36, to see if any fragments can be discarded (culled) at this stage. To do this, it compares the depth values of (associated with) fragments issuing from the rasteriser 36 with the depth values of fragments that have already been rendered (these depth values are stored in a depth (Z) buffer that is part of the tile buffer 41) to determine whether the new fragments will be occluded by fragments that have already been rendered (or not). At the same time, an early stencil test is carried out.

Fragments that pass the fragment early Z and stencil test stage 37 are then sent to the fragment shading stage 38. The fragment shading stage 38 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 38 is in the form of a shader pipeline (a programmable fragment shader).

There is then a "late" fragment Z and stencil test stage 39, which carries out, inter alia, an end of pipeline depth test on the shaded fragments to determine whether a rendered fragment will actually be seen in the final image. This depth test uses the Z buffer value for the fragment's position stored in the Z-buffer in the tile buffer 41 to determine whether the fragment data for the new fragments should replace the fragment data of the fragments that have already been rendered, by, as is known in the art, comparing the depth values of (associated with) fragments issuing from the fragment shading stage 38 with the depth values of fragments that have already been rendered (as stored in the depth buffer). This late fragment depth and stencil test stage 39 also carries out any necessary "late" alpha and/or stencil tests on the fragments.

The fragments that pass the late fragment test stage 39 are then subjected to, if required, any necessary blending operations with fragments already stored in the tile buffer 41 in the blender 40. Any other remaining operations necessary on the fragments, such as dither, etc. (not shown) are also carried out at this stage.

Finally, the (blended) output fragment data (values) are written to the tile buffer 41 from where they can, for example, be output to a frame buffer for display. The depth value for an output fragment is also written appropriately to a Z buffer within the tile buffer 41. (The tile buffer stores colour and depth buffers that store an appropriate colour, etc., or Z value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 41 is input to a downsampling (multisample resolve) write out unit 42, and thence output (written back) to an external memory output buffer, such as a frame buffer of a display device (not shown). (The display device could comprise, e.g., a display comprising an array of pixels, such as a computer monitor or a printer.)

The downsampling and writeout unit 42 downsamples the fragment data stored in the tile buffer 41 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 30 would, of course, be possible.

As can be seen from FIG. 5, the graphics processing pipeline 30 includes a number of programmable processing or "shader" stages, namely the vertex shader 31, hull shader 32, domain shader 34, geometry shader 35, and the fragment shader 38. These programmable shader stages execute respective shader programs that have one or more input variables and generate sets of output variables and that are provided by the application.

To do this, the application 22 provides the shader programs implemented using a high-level shader programming language, such as GLSL, HLSL, OpenCL, etc. These shader programs are then translated by a shader language compiler to binary code for the target graphics processing pipeline 30. This may include the creation of one or more intermediate representations of the program within the compiler. (The compiler may, e.g., be part of the driver 24, with there being a special API call to cause the compiler to run. The compiler execution can thus be seen as being part of the draw call preparation done by the driver in response to API calls generated by an application).

FIG. 5 shows schematically the operation stages of the graphics processing unit 23.

Figure 6:
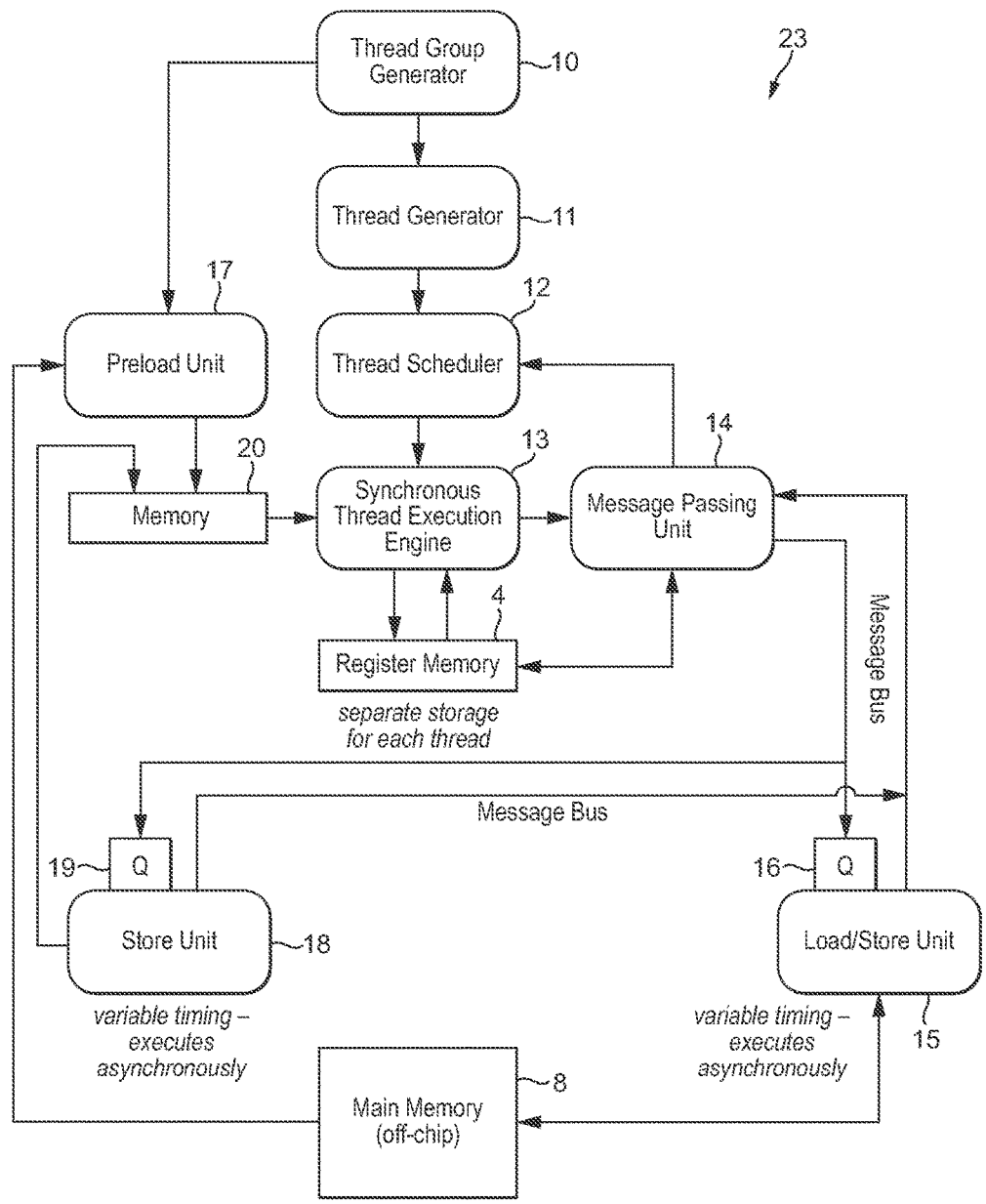
FIG. 6 shows an embodiment of the technology described herein.

FIG. 6 shows the corresponding functional units of the graphics processing unit 23 that are used to perform (and thus to act as) various ones of the processing operations and stages of the graphics processing pipeline shown in FIG. 5 and that are relevant to the technology described herein. (There may be other functional units in the graphics processing unit 23. FIG. 6 shows those functional units that are relevant to operation in the manner of the technology described herein only for simplicity.)

As shown in FIG. 6, the graphics processing unit 23 includes a thread group generator 10, a thread generator 11, a thread scheduler 12, a (programmable) synchronous thread execution unit 13, a message passing unit 14, a load/store unit 15 having an associated queue 16, a local register memory 4, and a local single-ported fast access RAM 20 together with an associated preload unit 17. The graphics processing unit 23 of the present embodiment also comprises a fast access RAM store unit 18 having an associated queue 19. Also shown in FIG. 6 is the main (off-chip) memory 8 of the overall graphics processing system.

The thread group generator 10 is operable to generate groups of threads for execution by the execution unit 13. As part of this operation, as shown in FIG. 6, the thread group generator 10 will cause one or more constant values (e.g. uniform variables) to be loaded into the fast access RAM 20 from the main memory 8 via the preload unit 17. The thread generator 11 is operable to generate (spawn) individual execution threads of each thread group. The thread scheduler 12 is operable to control the timing of the execution of the threads generated by the thread generator 11 by issuing each thread to the thread execution unit 13 at the appropriate time.

The thread execution unit 13 operates to execute shader programs to perform the shader operations of the graphics processing pipeline. To do this, it receives execution threads from the thread scheduler 12 and executes the relevant shader program for those execution threads. As part of this operation, and as shown in FIG. 6, the execution threads can read constant values from the fast access RAM 20 and can read data from and write data to respective registers 4, in a synchronous manner (i.e. such that the execution of each thread will not continue until the read or write operation has been completed).

The execution threads can also read data from and write data to the main memory 8 in an asynchronous manner (i.e. without the shader program execution for a thread waiting for the read or write operation to complete). This is done by sending requests to the load/store unit 15 via the message passing unit 14 and the queue 16. Data to be stored in main memory 8 is written from the register memory 4. Data read from main memory 8 is loaded into the register memory 4 via the message passing unit 14, from where it can be read synchronously by the execution threads.

In addition to this, the execution threads can write data to the fast access RAM 20 in an asynchronous manner (i.e. without the execution of each thread waiting for the read or write operation to complete). This is done by sending write requests to the fast access RAM store unit 18 via the message passing unit 14 and the queue 19.

The fast access RAM store unit 18 operates to write the data to the fast access RAM 20. However, since the fast access RAM 20 is a single-ported memory which can be read by execution threads executed by the execution unit in a synchronous manner, in the present embodiment, read requests are prioritised over write requests. Accordingly, the fast access RAM store unit 18 is arranged such that output data from the execution unit is stored in the fast access RAM 20 via the fast access RAM's single port only when the execution unit is not reading data from the fast access RAM 20. Accordingly, the queue 19 operates to queue pending write requests until they can be processed.

Figure 7:
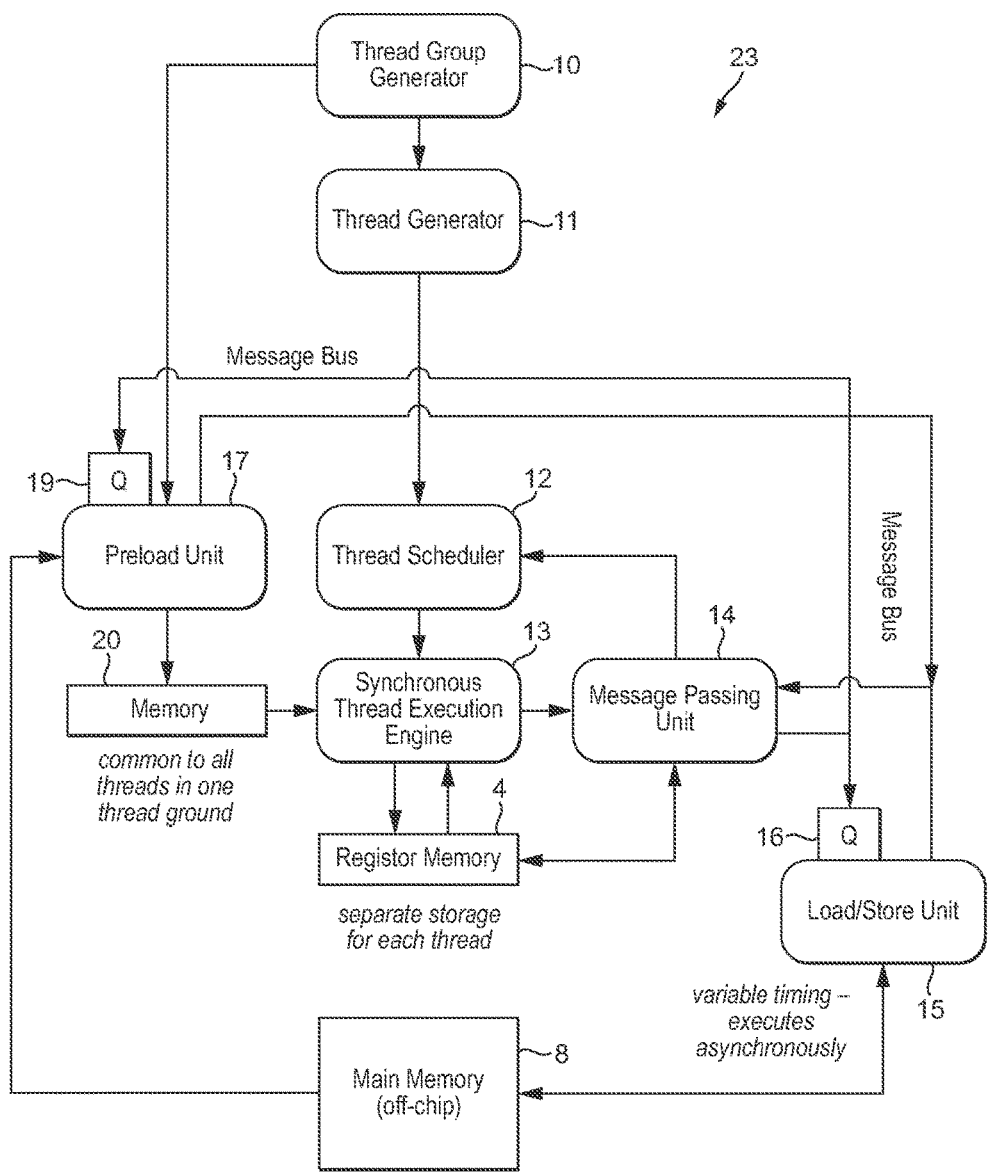
FIG. 7 shows an embodiment of the technology described herein.

FIG. 7 shows an alternative embodiment of the functional units of the graphics processing unit 23 that are used to perform (and thus to act as) various ones of the processing operations and stages of the graphics processing pipeline shown in FIG. 5 and that are relevant to the technology described herein.

As shown in FIG. 7, according to this embodiment, the graphics processing unit 23 again includes a thread group generator 10, a thread generator 11, a thread scheduler 12, a (programmable) synchronous thread execution unit 13, a message passing unit 14, and a load/store unit 15 having an associated queue unit 16, a register memory 4, and a fast access RAM 20 together with an associated preload unit 17. The preload unit 17 of this embodiment also comprises an associated queue 19.

The graphics processing unit 23 shown in FIG. 7 operates substantially in the same manner as the graphics processing unit 23 shown in FIG. 6. However, in this embodiment, the execution threads can write data to the fast access RAM 20 in an asynchronous manner by sending requests directly to the preload unit 17 via the message passing unit 14 and the preload unit's queue 19.

As discussed above, the programmable execution unit 13 executes shader programs to be executed for execution threads that it received from the thread scheduler 12 to perform graphics processing operations.

A number of embodiments for the execution of shader programs by execution threads in the programmable execution unit 13 will now be described with reference to FIGS. 6 to 9.

As discussed above, the Applicants have recognised that many shader programs may contain "common" expressions that will produce the same result for plural threads that execute the shader program, as well as "per thread" expressions that will need to be executed independently for each thread that executes the shader program.

In the present embodiment "common" expressions in shader programs are arranged to appear at the beginning of the shader program, and appropriate store instructions are included in the shader program such that the results of some or all of the "common" expressions are stored in the fast access RAM 20. Correspondingly, appropriate load instructions are included in the shader program such that the results of some or all of the "common" expressions can be subsequently read from the fast access RAM 20 as appropriate.

Figure 8:
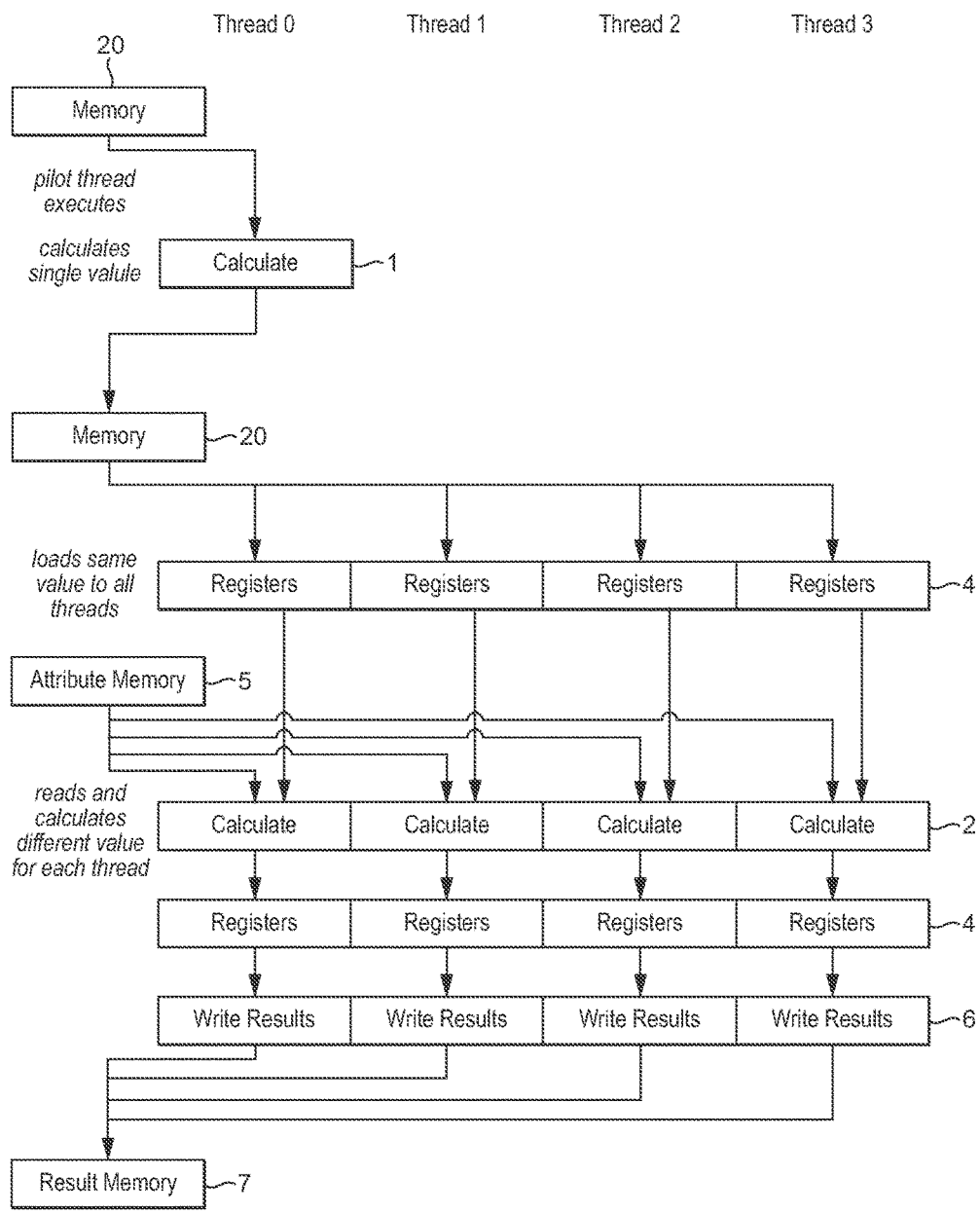
FIG. 8 shows schematically the execution of a shader program by multiple threads in parallel according to an embodiment of the technology described herein.

FIG. 8 shows an example of this in a shader program. FIG. 8 shows the execution of an exemplary shader, which can be divided into two distinct workloads, a set of expressions 1 in the shader program that will produce the same results for each execution thread, and a set of expressions 2 that need to be executed independently for each thread.

A compiler can compile the shader program into these two distinct workloads, a "common expression" workload 1 and a "per thread" workload 2, and can include the appropriate fast access RAM 20 load and store instructions in the shader program.

Thus, for example, the compiler can include one or more fast access RAM store instructions in the shader program in respect of the results of the "common expression" 1 calculations, where each fast access RAM store instruction is arranged such that when an execution thread executes that instruction, the common expression result or results is stored in the fast access RAM 20. Correspondingly, the compiler can include one or more fast access RAM load instructions in the shader program in respect of the results of the "common expression" 1 calculations, where each fast access RAM load instruction is arranged such that when an execution thread executes that instruction, the common expression result or results is read from the fast access RAM 20, e.g. for use by the thread.

Figure 9:
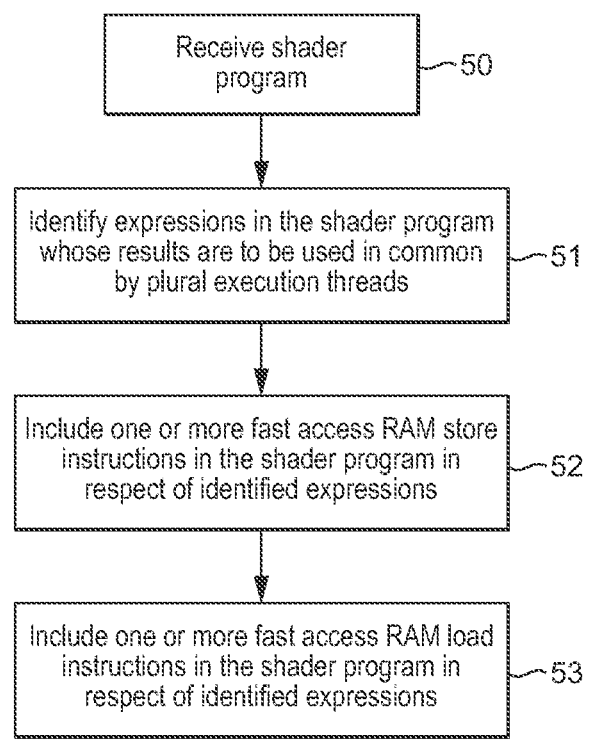
FIG. 9 shows schematically the operation of a compiler in accordance with an embodiment of the technology described herein.

FIG. 9 illustrates this aspect of the compilation process. As shown in FIG. 9, the shader compiler will receive a shader program in a high level programming language to be compiled (step 50), and firstly identify expressions in the shader program whose results are to be used in common by plural execution threads (step 51). When an expression in the shader program whose result is to be used in common by plural execution threads is identified, a corresponding fast access RAM store instruction is included in the shader program (step 52), such that when an execution thread executes that instruction, the result or results is stored in the fast access RAM 20. Corresponding fast access RAM load instructions can also be included in the shader program (step 53), i.e. such that when an execution thread executes (processes) that instruction, the (common) expression result or results is read from the fast access RAM 20 for use by the thread.

In the embodiment shown in FIG. 8, a single "pilot thread" executes the uniform variable calculations 1, and the result is stored in the fast access RAM 20 (i.e. according to a fast access RAM store instruction in the shader program). This result is then shared between each of the threads by loading the result into each thread's register 4 (i.e. according to a fast access RAM load instruction in the shader program). Each thread can then read one or more other variables or attributes as appropriate from an attribute memory 5 in main memory, execute the per thread calculations 2, and store the results in the thread's register 4. The final results can be written out 6 for each thread to a result memory 7 in main memory.

Thus, when executing the shader program, a single thread, for example, can be configured to execute the common expressions 1, with other threads only executing the per thread expressions 2 (and using the result(s) from the thread that executed the common expressions 1). This then helps to reduce or avoid repeated execution of the common expressions 1 for plural execution threads.

In this process, the pilot thread that executes the common expression instructions saves its results to the fast access RAM 20, so that those results are then available for the main threads (that have not themselves executed the common expressions 1) when they execute the relevant instruction sequence(s).

Accordingly, the fact that the common expression results have been successfully stored in the fast access RAM 20 is communicated to the thread scheduler 12 by the fast access RAM store unit 18 or the preload unit 17 sending appropriate messages to the thread scheduler via the message passing unit 14. The thread scheduler 12 can then appropriately release the main threads in response to this.

Figure 10:
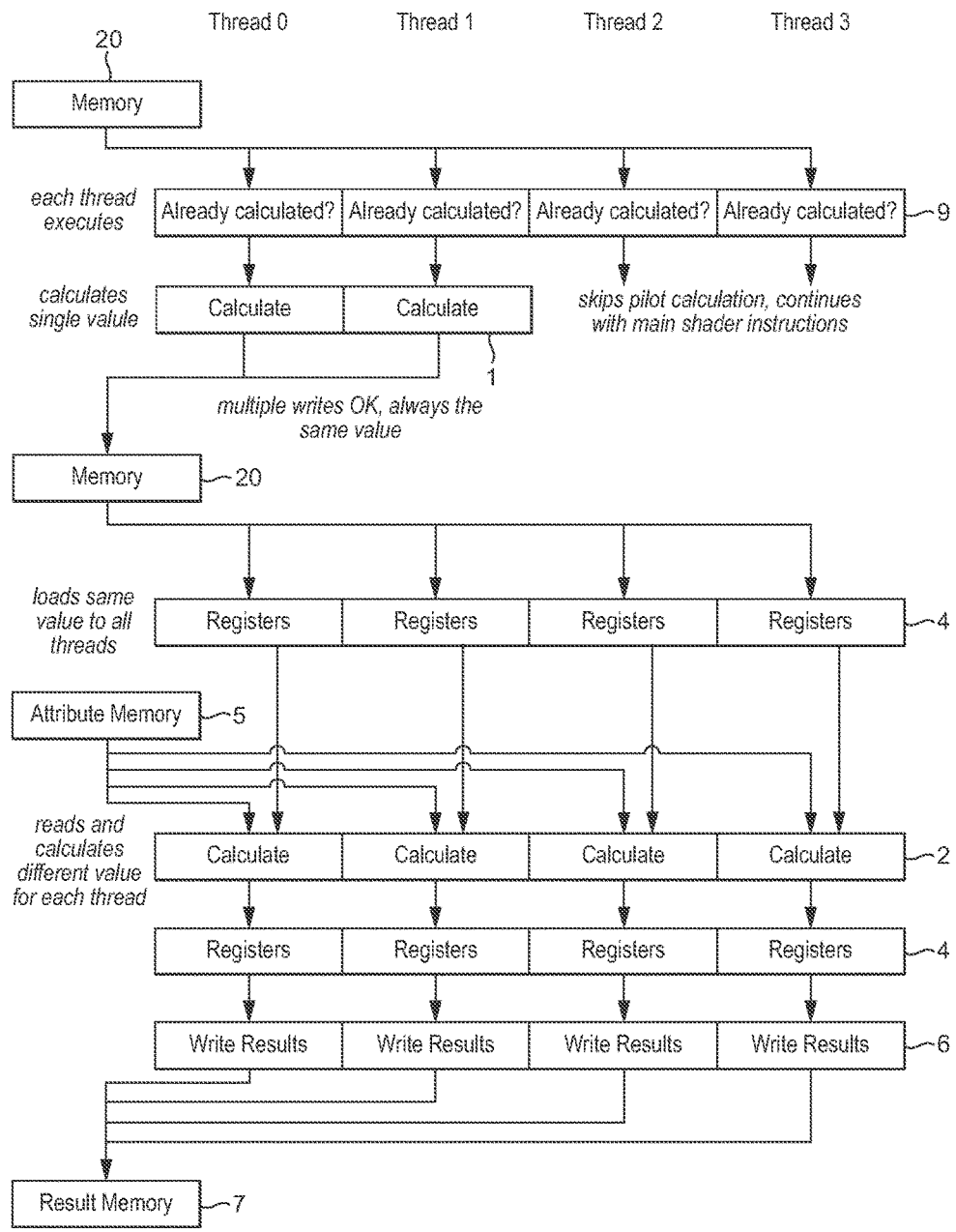
FIG. 10 shows schematically the execution of a shader program by multiple threads in parallel according to an embodiment of the technology described herein.

FIG. 10 shows schematically the execution of multiple threads in parallel in a shader program according to an alternative embodiment, where the shader program again includes common expressions 1 and per thread expressions 2.

However, as shown in FIG. 10, in this embodiment, for each thread, it is also determined 9 whether or not one or more of the other threads has already executed the common expressions 1 and whether or not the result has been stored in the fast access RAM 20. If, for a given thread, it is determined that this has not already happened, then the thread in question executes the common expressions 1 and generates a write request to store the results in the fast access RAM 20 (i.e. according to a fast access RAM store instruction in the shader program).

If, for a given thread, it is determined that one or more of the other threads has already executed the common expressions 1 and the result has been stored in the fast access RAM 20, then the thread in question skips the common expressions 1.

In this case, the common expression result(s) stored in the fast access RAM 20 is shared between each of the threads as necessary by loading the result into each thread's register 4 (i.e. according to a fast access RAM load instruction in the shader program). Each thread can then read one or more other variables or attributes as appropriate from the attribute memory 5 in main memory, execute the per thread expressions 2, and store the results in the thread's register 4. The final result is written out 6 for each thread to a result memory 7 in main memory.

This is repeated for each thread that the shader program is to be executed for.

In this processes, the threads that execute the common expression instructions save their results to the fast access RAM 20, so that those results are then available for later threads (that have not themselves executed the common expressions 1) when they execute the relevant instruction sequence(s).

Accordingly, the fact that the common expression results have been successfully stored in the fast access RAM 20 is communicated to the thread scheduler 12 by the fast access RAM store unit 18 or the preload unit 17 sending appropriate messages to the thread scheduler via the message passing unit 14. The thread scheduler 12 can then appropriately cause later threads to skip the common expressions 1 in response to this, e.g. by configuring the execution threads to execute or not execute the common expressions 1 in the shader program.

It would also or instead be possible for the common expression instructions 1 to be denoted as such, with execution threads then determining whether the results for those instructions have already been stored or not (e.g. by probing the validity of corresponding stored data or checking a flag or other indication that indicates whether the results for those instructions have already been stored or not) when they encounter a marked "common expression" instruction, and either executing the "common expression" instruction when it is determined that the results of those instructions have not yet been stored, or skipping those instructions when it is determined that the common expression results has been stored by another thread.

Where, as shown in FIG. 10, multiple threads that start at the beginning of the shader program are issued, each thread will generate one or more fast access RAM write requests in respect of the common expression results. Each of these fast access RAM write requests is queued in the fast access RAM queue 19. Accordingly, there may be multiple identical write requests in respect of the common expression results queued in the fast access RAM queue 19.

Each of the multiple identical write requests may be processed as normal by the fast access RAM store unit 18 or the preload unit 17 so as to (repeatedly) store the common expression results in the fast access RAM 20. In this case, the multiple identical write requests may be merged to the same memory address, since the common expression results will, by definition, be identical.

Alternatively, the fast access RAM store unit 18 or the preload unit 17 and/or the fast access RAM queue 19 may be operable to identify and discard write requests that are identical to write requests that have already been processed. This can then reduce the number of write operations, and therefore the power requirements of the system further.

Various modifications, additions and alternatives to the above-described embodiments of the technology described herein would be possible, if desired.

For example, where the shader program includes instructions that execute expressions which need to be executed for each thread individually, but which are not dependent upon the results of earlier instructions that execute common expressions in the shader program, then those instructions which are not dependent upon the results of earlier instructions that execute common expressions in the graphics shader program can be arranged to occur in the sequence of instructions for the shader program after the instructions that execute the common expressions, but before any "per thread" instructions that are dependent upon the common expressions. This can then allow, for example, execution threads that are to start at that later point in the shader program execution sequence to start executing instructions before the instructions that perform the common expressions have been completed.

As can be seen from the above, the technology described herein, in its embodiments at least, provides an improved, more bandwidth efficient arrangement for graphics processing units that execute shader programs. This is achieved, in embodiments of the technology described herein at least, by allowing an execution unit to store output data in a local memory that stores data that is accessible by plural execution threads as they execute.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A graphics processing circuit, comprising:
    programmable execution circuitry operable to execute graphics processing programs for execution threads to perform graphics processing operations;
    a local register memory comprising one or more registers, respective registers of the register memory being assignable to store data associated with an individual execution thread that is being executed by the execution circuitry, the register or registers assigned to an individual execution thread being, while that thread executes, accessible only to that associated individual execution thread; and
    a further local memory operable to store data for use in common by plural execution threads that are being executed by the execution circuitry, the data stored in the further local memory being accessible to plural execution threads as they execute, wherein the graphics processing circuit is configured to store one or more constant values in the further local memory for use by plural execution threads, and wherein the further local memory comprises a single-ported memory;

wherein the programmable execution circuitry is operable to selectively store output data for an execution thread in a register or registers of the register memory assigned to the execution thread, and the further local memory;

wherein the further local memory is readable by the programmable execution circuitry in a synchronous manner; and wherein the graphics processing circuit is arranged such that output data from the execution circuitry to be stored in the further local memory is stored in the further local memory when the execution circuitry is other than reading data from the further local memory.

2. The graphics processing circuit of claim 1, further comprising a store circuit operable to store output data for an execution thread in the further local memory.

3. The graphics processing circuit of claim 1, further comprising a preload circuit operable to store data from an external memory in the further local memory;
   wherein the preload circuit is further operable to store output data for an execution thread in the further local memory.

4. The graphics processing circuit of claim 1, wherein the graphics processing circuit is configured to store in the further local memory output data that is to be used in common by plural execution threads.

5. The graphics processing circuit of claim 1, wherein the graphics processing circuit is configured to store in the further local memory output data for an execution thread that is generated by the execution thread executing instructions that calculate common expressions in the graphics processing program.

6. The graphics processing circuit of claim 1, wherein the graphics processing circuit is configured to issue to the execution unit threads that execute instructions in the graphics processing program after at least some of the instructions in the graphics processing program that calculate common expressions in the graphics processing program after at least some output data for a thread is stored in the further local memory.

7. The graphics processing circuit of claim 1, wherein the graphics processing circuit is configured:
   to store output data in the further local memory by sending write requests to the further local memory; and
   to discard write requests that correspond to write requests that have already been processed.

8. A computer readable storage medium storing computer software code which when executing on a processor performs a method of compiling a program to generate instructions for programmable execution circuitry of a graphics processing circuit that executes instructions to perform graphics processing operations, the graphics processing circuit comprising:
   a local register memory comprising one or more registers, respective registers of the register memory being assignable to store data associated with an individual execution thread that is being executed by the execution circuitry, the register or registers assigned to an individual execution thread being, while that thread executes, accessible only to that associated individual execution thread; and
   a further local memory operable to store data for use in common by plural execution threads that are being executed by the execution circuitry, the data stored in the further local memory being accessible to plural execution threads as they execute, wherein the graphics processing circuit is configured to store one or more constant values in the further local memory for use by plural execution threads, wherein the further local memory comprises a single-ported memory, and wherein the further local memory is readable by the programmable execution circuitry in a synchronous manner, and wherein the graphics processing circuit is arranged such that output data from the execution circuitry to be stored in the further local memory is stored in the further local memory when the execution circuitry is other than reading data from the further local memory;

the method comprising, for a graphics processing program to be executed by the programmable execution circuitry:
   identifying expressions in the graphics processing program whose results are to be used in common by plural execution threads; and
   when an expression in the graphics processing program whose result is to be used in common by plural execution threads is identified, including a further local memory store instruction in the graphics processing program, such that when an execution thread executes that instruction, the result or results is stored in the further local memory.

9. A method of operating a graphics processing circuit that comprises:
   a programmable execution circuit operable to execute graphics processing programs for execution threads to perform graphics processing operations;
   a local register memory comprising one or more registers, respective registers of the register memory being assignable to store data associated with an individual execution thread that is being executed by the execution circuit, the register or registers assigned to an individual execution thread being, while that thread executes, accessible only to that associated individual execution thread; and
   a further local memory operable to store data for use in common by plural execution threads that are being executed by the execution circuit, the data stored in the further local memory being accessible to plural execution threads as they execute, wherein the graphics processing circuit is configured to store one or more constant values in the further local memory for use by plural execution threads, wherein the further local memory comprises a single-ported memory, and wherein the further local memory is readable by the programmable execution circuit in a synchronous manner;

the method comprising the programmable execution circuit when executing a graphics processing program for an execution thread to perform graphics processing operations, storing output data for the execution thread in the further local memory when the execution unit is other than reading data from the further local memory.

10. The method of claim 9, further comprising a store circuit of the graphics processing circuit storing output data for an execution thread in the further local memory.

11. The method of claim 9, further comprising a preload circuit of the graphics processing circuit storing data from an external memory in the further local memory; and
   the preload circuit storing output data for an execution thread in the further local memory.

12. The method of claim 9, further comprising the programmable execution circuit storing in the further local memory output data that is to be used in common by plural execution threads.

13. The method of claim 9, further comprising when an execution thread executes instructions in the graphics processing program that calculate common expressions, storing the output data in the further local memory.

14. The method of claim 9, further comprising the graphics processing circuit issuing to the execution circuit threads that execute instructions for the graphics processing program after at least some of the instructions in the graphics processing program that calculate common expressions in the graphics processing program after at least some output data for a thread has been stored in the further local memory.

15. The method of claim 9, further comprising:
storing output data in the further local memory by sending write requests to the further local memory; and
discarding write requests that correspond to write requests that have already been processed.

16. A method of compiling a program to generate instructions for a programmable execution circuit of a graphics processing circuit that executes instructions to perform graphics processing operations, the graphics processing circuit comprising:
a local register memory comprising one or more registers, respective registers of the register memory being assignable to store data associated with an individual execution thread that is being executed by the execution circuit, the register or registers assigned to an individual execution thread being, while that thread executes, accessible only to that associated individual execution thread; and
a further local memory operable to store data for use in common by plural execution threads that are being executed by the execution circuit, the data stored in the further local memory being accessible to plural execution threads as they execute, wherein the graphics processing circuit is configured to store one or more constant values in the further local memory for use by plural execution threads, wherein the further local memory comprises a single-ported memory, and wherein the further local memory is readable by the programmable execution circuit in a synchronous manner, and wherein the graphics processing circuit is arranged such that output data from the execution circuit to be stored in the further local memory is stored in the further local memory when the execution circuit is other than reading data from the further local memory;
the method comprising, for a graphics processing program to be executed by the programmable execution circuit:
identifying expressions in the graphics processing program whose results are to be used in common by plural execution threads; and
when an expression in the graphics processing program whose result is to be used in common by plural execution threads is identified, including a further local memory store instruction in the graphics processing program, such that when an execution thread executes that instruction, the result or results is stored in the further local memory.

17. A computer readable storage medium storing computer software code which when executing on a processor performs a method of operating a graphics processing circuit that comprises:
a programmable execution circuit operable to execute graphics processing programs for execution threads to perform graphics processing operations;
a local register memory comprising one or more registers, respective registers of the register memory being assignable to store data associated with an individual execution thread that is being executed by the execution circuit, the register or registers assigned to an individual execution thread being, while that thread executes, accessible only to that associated individual execution thread; and
a further local memory operable to store data for use in common by plural execution threads that are being executed by the execution circuit, the data stored in the further local memory being accessible to plural execution threads as they execute, wherein the graphics processing circuit is configured to store one or more constant values in the further local memory for use by plural execution threads, wherein the further local memory comprises a single-ported memory, and wherein the further local memory is readable by the programmable execution circuit in a synchronous manner;
the method comprising the programmable execution circuit when executing a graphics processing program for an execution thread to perform graphics processing operations, storing output data for the execution thread in the further local memory when the execution circuit is other than reading data from the further local memory.

* * * * *